(12) United States Patent
Roberts

(10) Patent No.: US 11,797,439 B2
(45) Date of Patent: *Oct. 24, 2023

(54) BALANCING MEMORY-PORTION ACCESSES

(71) Applicant: Micron Technology, Inc., Boise, ID (US)

(72) Inventor: David Andrew Roberts, Wellesley, MA (US)

(73) Assignee: Micron Technologies, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,541

(22) Filed: Sep. 12, 2022

(65) Prior Publication Data
US 2023/0031680 A1    Feb. 2, 2023

Related U.S. Application Data

(63) Continuation of application No. 17/070,774, filed on Oct. 14, 2020, now Pat. No. 11,442,854.

(51) Int. Cl.
*G06F 12/02* (2006.01)
*G06F 12/0802* (2016.01)

(52) U.S. Cl.
CPC ...... *G06F 12/0292* (2013.01); *G06F 12/0802* (2013.01)

(58) Field of Classification Search
CPC .......................... G06F 12/0802; G06F 12/0292
USPC ............................................................ 711/3
See application file for complete search history.

(56) References Cited

U.S. PATENT DOCUMENTS

| 6,006,345 | A | 12/1999 | Berry |
| 10,706,147 | B1 * | 7/2020 | Pohlack .............. H04L 63/1416 |
| 2009/0094494 | A1 | 4/2009 | Takeshima |
| 2011/0055489 | A1 | 3/2011 | Reddy et al. |

(Continued)

OTHER PUBLICATIONS

"Final Office Action", U.S. Appl. No. 17/070,774, filed Feb. 22, 2022, 17 pages.

(Continued)

*Primary Examiner* — Hua J Song
(74) *Attorney, Agent, or Firm* — Colby Nipper PLLC

(57) ABSTRACT

Described apparatuses and methods balance memory-portion accessing. Some memory architectures are designed to accelerate memory accesses using schemes that may be at least partially dependent on memory access requests being distributed roughly equally across multiple memory portions of a memory. Examples of such memory portions include cache sets of cache memories and memory banks of multi-bank memories. Some code, however, may execute in a manner that concentrates memory accesses in a subset of the total memory portions, which can reduce memory responsiveness in these memory types. To account for such behaviors, described techniques can shuffle memory addresses based on a shuffle map to produce shuffled memory addresses. The shuffle map can be determined based on a count of the occurrences of a reference bit value at bit positions of the memory addresses. Using the shuffled memory address for memory requests can substantially balance the accesses across the memory portions.

20 Claims, 12 Drawing Sheets

(56) References Cited

U.S. PATENT DOCUMENTS

2017/0109632 A1 4/2017 Bhandary
2022/0114093 A1 4/2022 Roberts

OTHER PUBLICATIONS

"Non-Final Office Action", U.S. Appl. No. 17/070,774, filed Sep. 13, 2021, 15 pages.
"Notice of Allowance", U.S. Appl. No. 17/070,774, May 4, 2022, 5 pages.
Liu, et al., "Get Out of the Valley: Power-Efficient Address Mapping for GPUs", Peking University; Norwegian University of Science and Technology; Michigan Technological University; Ghent University; IEEE, 2018, 14 pages.
Zhang, "Reducing Cache Misses Through Programmable Decoders", University of Missouri-Kansas City; ACM Transactions on Architecture and Code Optimization, vol. 4, No. 4, Article 24, Jan. 2008, 31 pages.

* cited by examiner

BALANCING MEMORY-PORTION ACCESSES

CROSS-REFERENCE TO RELATED APPLICATION(S)

This application is a continuation application of U.S. application Ser. No. 17/070,774, filed 14 Oct. 2020, the disclosure of which is incorporated by reference herein in its entirety.

BACKGROUND

A computer may have a processor that operates faster than the computer's memory. Because of this speed difference, a faster processor waits to receive requested data from a slower memory. This waiting can inhibit the processor from providing a service to a user, such as playing a video or updating a document's appearance. The waiting can cause a computer to slow operations enough that the computer appears to freeze, thereby frustrating the user. Furthermore, this speed difference can inhibit the growth of features and applications for the computer, as software designers forgo the addition of new applications and features because doing so would degrade the computer's performance.

BRIEF DESCRIPTION OF THE DRAWINGS

Apparatuses of and techniques for balancing memory-portion accesses are described with reference to the following drawings. The same numbers are used throughout the drawings to reference like features and components:

FIG. 1-1 illustrates another example apparatus that can implement balancing memory-portion accesses and that includes a host device and a memory device.

FIG. 1-2 illustrates example "discrete" implementations of a memory portion balancer that can be included in different individual devices.

FIG. 1-3 illustrates example "distributed" implementations of a memory portion balancer that is included across a host device and a memory device.

FIG. 2-1 illustrates an example memory that includes multiple selected memory portions and an example memory portion balancer that includes memory address circuitry and a bit counter array.

FIG. 2-2 illustrates example memory address circuitry and an example bit counter array that can track bit count values.

FIG. 2-3 illustrates an example distributed memory portion balancer that is separated into two parts.

FIG. 3 illustrates an example approach to analyzing bit count values from bit positions of multiple memory addresses to determine multiple bit ratios.

FIG. 4-1 illustrates an example implementation for balancing memory-portion accesses in a hierarchical memory architecture with a cache memory in which the multiple selected memory portions are realized as multiple cache sets.

FIG. 4-2 illustrates an example implementation for balancing memory-portion accesses in a memory architecture with a multibank memory in which the multiple selected memory portions are realized as multiple memory banks.

DETAILED DESCRIPTION

Overview

Figure 1:
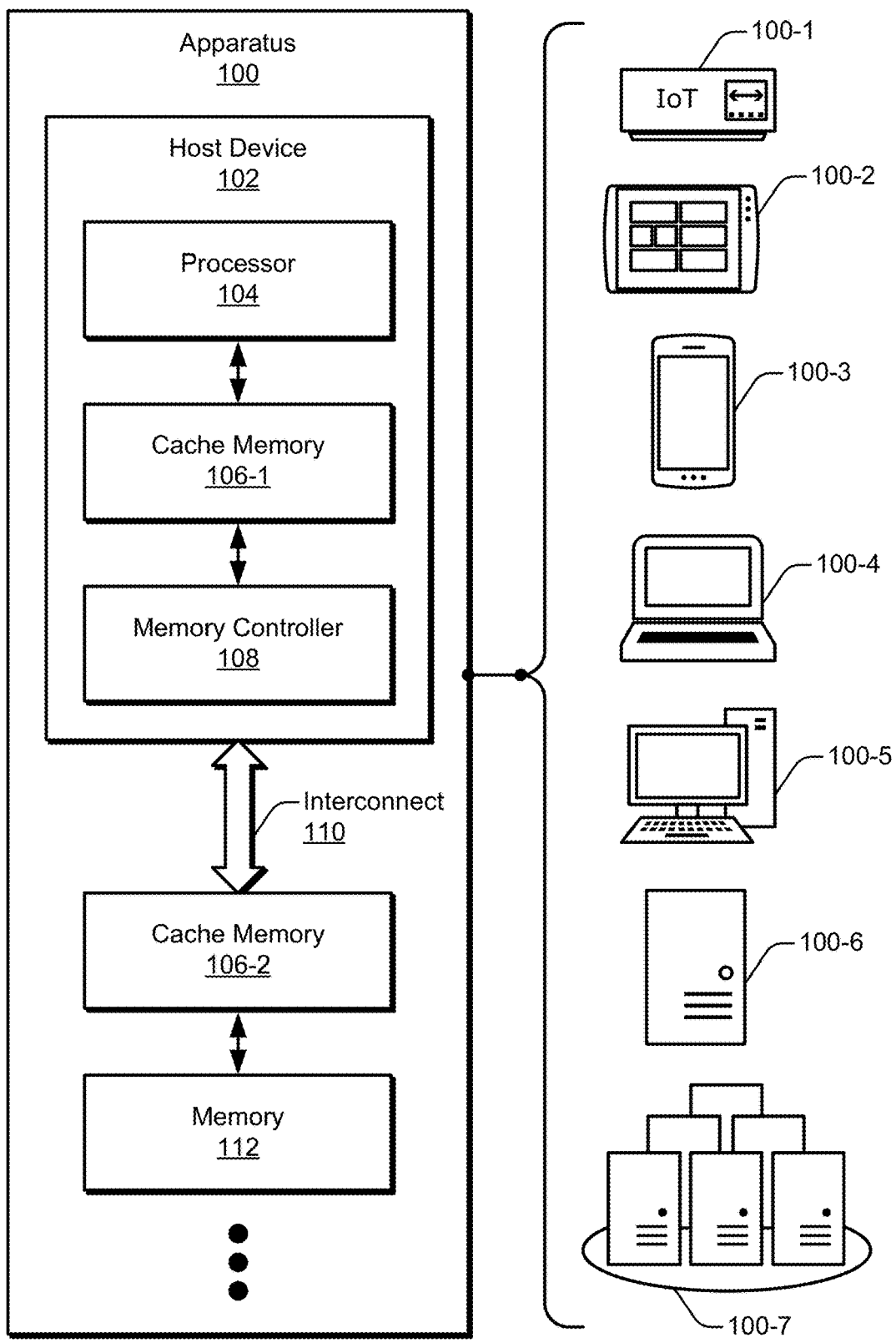
FIG. 1 illustrates example apparatuses that can implement balancing memory-portion accesses.
Figure 1:
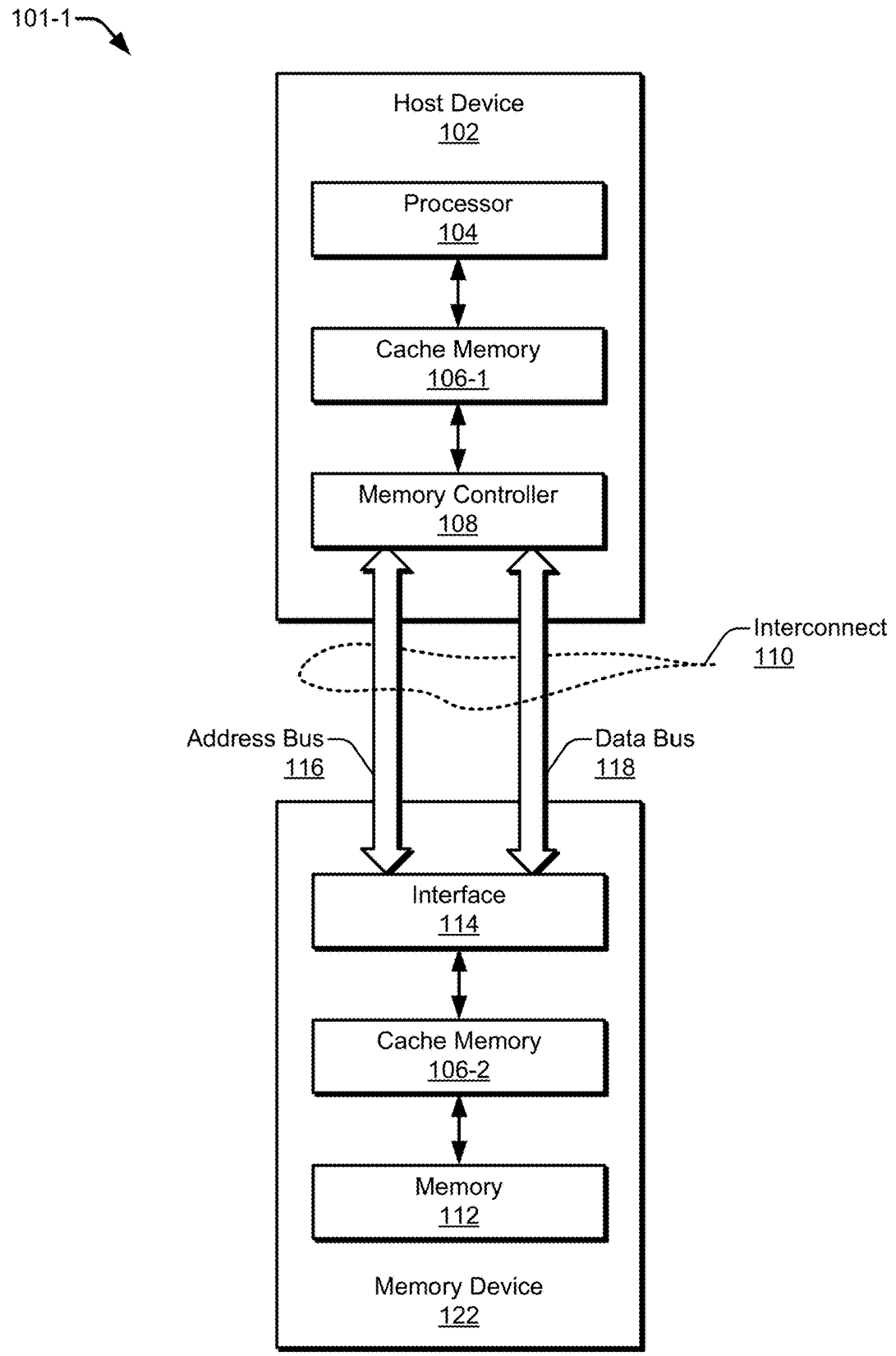

Computers provide services and features using a processor that is communicatively coupled to a memory. Because processors can use data faster than some memories can accommodate, many computers employ one or more schemes to accelerate memory accessing. These schemes that accelerate memory accessing can therefore reduce the speed difference between processors and memories. One scheme to accelerate memory accessing involves using a hierarchical memory system. Hierarchical memories can be designed to operate efficiently in terms of weighing cost versus speed. Relatively faster memories are typically more expensive than relatively slower memories, so computer hardware designers attempt to balance their relative costs and benefits. One approach is to use a smaller amount of faster, more expensive memory with a larger amount of slower, less expensive memory. The faster memory is deployed at a higher level than the slower memory in the hierarchical memory system such that the faster memory is preferably accessed by the processor first. An example of a relatively faster memory is called a cache memory. Although a cache-based hierarchical memory system can accelerate memory accessing, such schemes may fail to provide expected results in some computing environments.

Generally, schemes that accelerate memory accessing can involve hardware architectures of various designs. As described above, one example design scheme involves a hierarchical memory system that has a relatively faster cache memory and a relatively slower main memory. Another design scheme involves separating the main memory into banks of memory in which each bank can be accessed in parallel, which can be faster than accessing memory banks sequentially. If code (e.g., an application, a program, or a routine) being executed by a processor behaves in a certain manner, then these design schemes can accelerate memory accessing. On the other hand, if the code does not behave in an expected manner, then these schemes may accelerate memory accessing by an appreciably lesser degree, or they may even fail to accelerate memory accessing.

To address these situations, this document describes apparatuses and techniques that can operate to compensate when code does not behave in an expected manner. By adopting the described compensation techniques, memory-accessing schemes of various designs can be employed successfully with different types of executable code. As described herein, the accessing of various memory portions can be balanced by shuffling memory address bits. This balancing of memory-portion accesses can facilitate memory-access acceleration under different types of executing code.

This document describes various techniques, including those involving a cache-based hierarchical memory scheme or a banked-memory scheme. With a cache-based hierarchical memory scheme, a memory architecture includes a cache memory at a higher memory level and a main memory at a lower level. A subset of the data stored in the main memory is temporarily copied into the cache memory for faster access. If data targeted by a memory access request is present in the cache memory, there is a cache hit, and memory system can more quickly return the targeted data to the requesting processor from the cache memory. If instead the data targeted by the memory access request is not already present in the cache memory, there is a cache miss. With the cache miss, the memory system retrieves the targeted data more slowly from the main memory and then provides it to the requesting processor. Accordingly, a scheme to accelerate memory accessing that utilizes a cache memory is more effective the more often requested data is present in the cache memory.

One way to increase the likelihood that requested data is present in the cache memory is to increase a size of the cache memory. Larger cache memories, however, increase costs. Another way to increase cache hits is to increase utilization of a given cache size. In other words, if part of a cache is being unused because of some attribute of code that is currently being executed, the cache fails to accelerate memory accessing as much as may be possible with the given cache size. For example, if 30% of a cache is under-utilized, then memory accessing may be appreciably slower, which adversely impacts overall computing performance.

Generally, a "set-associative" type of cache memory can be constructed in a grid pattern using a memory array including rows and columns. The rows are called "sets" with a set-associative cache memory, and the columns are called "ways." In a four-way set-associative cache memory, for example, the cache memory may have thousands of sets (1000s of rows) with four ways (four columns) in each set. With some set-associative cache memory architectures, the memory system can move any given piece of data from the main memory into one designated cache set, but not into other cache sets. In other words, there may be a one-to-one correspondence between data and a set that is permitted to cache the data. Unlike with sets, however, the given piece of data can be cached in any of the four ways of the designated cache set. Accordingly, the set portions of cache memories can cause a bottleneck to utilization of a cache memory relative to the flexibility offered by the multiple ways of the cache memory.

A memory system maps, or indexes, data from the main memory into a corresponding set based on a subset of the bits in a memory address that indicates the requested data. A piece of code may execute in a looping manner with address strides that just happen to skip some memory address ranges. If the executing code happens to request data having memory addresses that do not map to 40% of the cache sets, then the code leaves 40% of the cache unused. This is equivalent to having a 40% smaller cache, which reduces the frequency or amount of data that the cache memory can provide in response to data requests. Thus, executing code may exhibit a behavior that appreciably impacts the ability of a cache architecture to accelerate memory accessing. In contrast, this document describes techniques and systems that can substantially balance utilization of the sets of a cache memory to increase a percentage of the cache that is made available for memory accessing during execution of code.

Architectures that separate a memory into banks, or banked-memory schemes, can also be employed to accelerate memory accessing. Here, each bank of memory can be accessed in parallel, which may be faster than accessing the memory banks sequentially. With parallel accessing of multiple memory banks, a memory system can perform multiple memory access requests at least partially simultaneously or overlapping instead of one at a time in series. For example, a memory controller can organize a group of memory access requests such that those requests that are targeting different banks are sent out together without other interceding memory requests. Consequently, the multiple memory banks can work to respond to the multiple memory requests in parallel. Even if the memory controller sends the memory requests out sequentially, the memory responses may be returned more quickly due to the parallel accessing operations because it can take longer for a memory bank to generate a response than it does to communicate a memory request or a memory response.

If a multibank memory has, e.g., four memory banks, four memory access requests can be processed in parallel. If a banked memory has eight banks, the banked memory can process up to eight memory access requests in parallel. Thus, a multibank memory architecture accelerates memory accessing in dependence, to at least some degree, on how many banks are included in the memory. With a fixed supply of memory banks, a multibank memory can process more memory requests in parallel if the memory controller issues more memory requests to a greater number of banks. In other words, if a subset of banks of a multibank memory is unused because of some unexpected attribute of the code that is currently being executed, the multibank memory may fail to accelerate memory accessing as much as may be possible with the fixed quantity of memory banks. For example, if 25% of the banks of a multibank memory are underutilized, then memory accessing may be appreciably slowed relative to the potential of the memory, and this slowing can adversely impact computing performance.

With a multibank memory, the memory system maps or routes memory access requests to corresponding banks based on a subset of the bits in a memory address that indicates the requested data. If executing code happens to request data having memory addresses that do not map to 25% of the memory banks, then 25% of the memory is unused in terms of enabling the faster parallel access. This is equivalent to using only 75% of the physically present banks with respect to processing memory requests in an overlapping manner. By omitting 25% of the memory banks, the executing code is reducing the speed or amount of data that the multibank memory can provide in response to parallel data requests. The effects are intensified or extended the longer the code executes or loops through the memory addresses that exclude the 25% or other portion of the memory banks. Thus, executing code may exhibit a behavior that appreciably impacts the ability of a banked memory architecture to accelerate memory accessing. In contrast, this document describes techniques and systems that can substantially balance utilization of the memory banks of a multibank memory to increase the percentage of the banks that are targeted for parallel memory accessing.

As described above, some cache memory architectures include multiple cache sets, and multibank memory architectures include multiple memory banks. A degree to which memory accessing is balanced across the multiple cache sets can impact the performance of cache memory. Similarly, an amount to which memory accessing is balanced across multiple memory banks can impact the performance of banked memory. As used herein, cache sets and memory banks are examples of different types of memory portions of a given memory architecture. Described apparatuses and techniques can increase balanced memory accessing across multiple memory portions to accelerate memory accessing, including with code having different execution behaviors.

In example implementations, a memory portion balancer can increase an amount by which memory requests are balanced across multiple memory portions, such as cache sets or memory banks. To do so, control logic determines a shuffle map that is used to shuffle a memory address to produce a shuffled memory address. Each memory address includes multiple memory address bits or bit positions, such as 32 or 64 bit positions. Individual ones of the memory address bits can be rearranged (e.g., reordered) to adjust which address bits map to which portions of a memory. The shuffled memory address balances memory access requests across the multiple memory portions over time by monitoring the behavior of executing code as evidenced by bit values of the bit positions.

In example operations, the memory portion balancer tracks bit values as bit value counts of bit positions across multiple memory addresses using a bit counter array. The bit counter array includes a bit counter for each bit position of at least a portion of the multiple bit positions of the memory address. Each bit counter stores a bit count value that is incremented each time a corresponding bit position in a memory address has a reference bit value (e.g., "0" or "1"). Responsive to timer expiration or reaching a certain number of memory transactions, the control logic analyzes the bit count values stored in the bit counter array. The control logic computes a bit ratio corresponding to each bit position of the memory address based on the corresponding bit count value from the bit counter. In some cases, the control logic computes each respective bit ratio based on the respective bit count value and a transaction count value. In such cases, bit ratios nearer 0.5 (e.g., nearer 50% of the transaction count value) indicate corresponding memory address bit positions that are approximately equally likely to take either binary value—0 or 1. In other cases, a bit ratio may be computed based on two bit count values corresponding respectively to 0 and 1. In such cases, the balanced 50% bit ratio, or 50-50 split, corresponds to 1/1 or 1.0. With either computation, these balanced bit positions are relatively more likely to correspond to memory requests that are distributed over substantially all available memory portions to which these bit positions are mapped for memory accesses.

In other words, the bit ratios can be used as an indicator of how well balanced the corresponding bit positions of the memory addresses are over time for a currently executing piece of code, even if different code exhibits different behaviors. A shuffle circuit remaps those bit positions that have bit ratios indicative of being closer to a 50-50 split in the memory address to different bit positions in the shuffled memory address to thereby address those memory portions of a memory that can benefit relatively more from being accessed on a balanced basis. Thus, the memory portion balancer can remap those bit positions having bit ratios closer to the 50-50 split to those bits that specify a selected memory portion to accelerate memory accessing. As is explained below, selected memory portions can comprise cache sets, memory banks, memory channels, and so forth.

For a cache memory, such selected memory portions can correspond to cache sets, instead of cache ways or byte offset bits. With cache memories, memory address bits may include set bits (also called index bits or set index bits) that correspond to the multiple cache sets and tag bits that correspond to the multiple ways per cache set. As described above, cache memory operation can be enhanced if accesses to each cache set are balanced among multiple cache sets. Thus, the memory portion balancer can remap those bit positions having bit ratios closer to a 50-50 split to the set bits to accelerate memory accessing for different types of code execution behaviors.

For a multibank memory, the selected memory portions that may benefit from being accessed in a balanced manner correspond to memory banks, instead of memory rows or memory columns. With banked memories, memory address bits may include bank-select bits that correspond to multiple banks, row-select bits that correspond to multiple rows, and column-select bits that correspond to multiple columns. As described above, operation of a multibank memory can be enhanced if accesses to each memory bank are balanced among multiple memory banks. The memory portion balancer can therefore remap those bit positions having bit ratios closer to 50% to the bank-select bits to accelerate memory accessing for different types of code execution behaviors. For memories with multiple channels, the memory portion balancer can additionally or alternatively remap those bit positions having bit ratios closer to 50% to the channel-select bits to accelerate memory accessing.

Thus, design schemes of certain memory architectures, such as cache memories and multibank memories, can accelerate memory accessing. The accelerated memory accessing can increase computing performance by decreasing the average response times for memory requests that are issued by a relatively faster processor. The effectiveness of these architectures is partially dependent on certain assumptions about the behavior of code that is currently executing on the processor. One such assumption is that the code will access certain memory portions of a memory in roughly equal amounts. In the absence of this behavior, however, the intended acceleration of the memory accessing may fail, and it may even decrease the performance of the memory.

To address these issues of some memory architectures, the apparatuses and techniques described in this document can increase the frequency or likelihood of producing roughly equal accessing across selected memory portions. This balanced accessing of memory portions can be achieved even when the code is not currently executing in a manner that automatically creates this balanced behavior. Accordingly, hardware applying the described principles can balance memory accesses while software is exhibiting various operational behavior patterns. The resulting memory access acceleration enables the software to operate more quickly and therefore provide a better user experience that offers more software features and/or fewer performance slowdowns.

Example Operating Environment for Balancing Memory-Portion Accesses

FIG. 1 illustrates an example apparatus 100 that can implement balancing memory-portion accesses. The apparatus 100 can be realized as, for example, at least one electronic device. Example electronic-device implementations include an internet-of-things (IoTs) device 100-1, a tablet device 100-2, a smartphone 100-3, a notebook computer 100-4, a desktop computer 100-5, a server computer 100-6, and a server cluster 100-7 that may be part of cloud computing infrastructure or a data center. Other apparatus examples include a wearable device, such as a smartwatch or intelligent glasses; an entertainment device, such as a set-top box, a smart television, or a gaming device; a motherboard or server blade; a consumer appliance; vehicles or the electronic components thereof; industrial equipment; and so forth. Each type of electronic device includes one or more components to provide some computing functionality or feature.

In example implementations, the apparatus 100 includes at least one host device 102, at least one processor 104, and at least one cache memory 106. The apparatus 100 can also include at least one memory controller 108, at least one interconnect 110, and at least one memory 112. The memory 112 may be realized, for example, with a dynamic random-access memory (DRAM) device or module, including with a three-dimensional (3D) stacked DRAM device, such as a high bandwidth memory (HBM) device or a hybrid memory cube (HMC) device. Additionally or alternatively, the memory 112 may be realized with a storage-class memory device, such as one employing 3D XPoint™ or phase-change memory (PCM). Other examples of the memory 112 are described below with reference to FIG. 1-1. As shown, the host device 102, or host 102, includes the processor 104, a cache memory 106-1, and the memory controller 108. The processor 104 is coupled to the cache memory 106-1, and the cache memory 106-1 is coupled to the memory controller 108. The processor 104 is also coupled, directly or indirectly, to the memory controller 108. The host device 102 is coupled to a cache memory 106-2 via the interconnect 110. The cache memory 106-2 is coupled to the memory 112. The host device 102 is also coupled, directly or indirectly, to the memory 112.

The depicted components of the apparatus 100 represent an example computing architecture with a hierarchical memory system. For example, the cache memory 106-1 is logically coupled between the processor 104 and the cache memory 106-2. Further, the cache memory 106-2 is logically coupled between the processor 104 and the memory 112. Here, the cache memory 106-1 is at a higher level of the hierarchical memory system than is the cache memory 106-2. Similarly, the cache memory 106-2 is at a higher level of the hierarchical memory system than is the memory 112. The depicted interconnect 110, as well as other interconnects that communicatively couple together various components (not shown), enable data to be transferred between or among the various components. Interconnect examples include a bus, a switching fabric, one or more wires that carry voltage or current signals, and so forth.

Although various implementations of the apparatus 100 are depicted in FIG. 1 and described herein, an apparatus 100 can be implemented in alternative manners. For example, the host device 102 may include multiple cache memories, including multiple levels of cache memory. Further, at least one other cache memory and memory pair may be coupled "below" the illustrated instance of the cache memory 106-2 and memory 112. The cache memory 106-2 and the memory 112 may be realized in various manners. In some cases, the cache memory 106-2 and the memory 112 can both be disposed on, or physically supported by, a motherboard with the memory 112 comprising "main memory." In other cases, the cache memory 106-2 can comprise DRAM, with the memory 112 comprising "storage memory" that is realized as flash memory or a magnetic hard drive. Nonetheless, the components may be implemented in alternative ways, including in distributed or shared memory systems. Further, a given apparatus 100 may include more, fewer, or different components.

FIG. 1-1 illustrates another example apparatus 101-1 that can implement balancing memory-portion accesses and that includes a host device 102 and a memory device 122. In the illustrated example, the host device 102 is coupled to the memory device 122 via the interconnect 110. For clarity, the host device 102 is depicted to include the processor 104, the cache memory 106-1, and the memory controller 108. The host device 102 can, however, include more, fewer, or different components.

The interconnect 110 can include multiple buses, such as an address bus 116 and a data bus 118. Although shown separately, the address but 116 and the data bus 118 may share one or more electrical pathways. The data bus 118 can propagate data between the host device 102 and the memory device 122. The address bus 116 can communicate addresses at least from the host device 102 to the memory device 122. Although not shown, the interconnect 110 can include a command bus. Alternatively, commands can be communicated via the address bus 116 or the data bus 118. Thus, memory-related communications—such as commands, messages, requests, or instructions—can be communicated on the address bus 116, the data bus 118, the command bus (not shown), or a combination thereof.

In example implementations, the memory device 122 includes the cache memory 106-2, the memory 112, and an interface 114. The interface 114 can include circuitry for facilitating communication over the interconnect 110, such as latches, buffers, drivers, receivers, and control logic. The control logic of the interface 114 may operate in accordance with at least one protocol or memory-access standard. Thus, the memory device 122 can be coupled to the interconnect 110 via the interface 114. The cache memory 106-2 can be coupled to the interface 114, and the memory 112 can be coupled to the interface 114 directly or through the cache memory 106-2. The memory 112 can be implemented as main memory or primary memory for an apparatus. Alternatively, the memory 112 can be implemented as backing storage or secondary storage for an apparatus.

The memory 112 can serve as a backstop to handle memory requests that the cache memory 106-2 is unable to satisfy. In some cases, the cache memory 106-2 is formed from static random-access memory (SRAM), and the memory 112 is formed from DRAM. In other cases, the cache memory 106-2 is formed from DRAM, and the memory 112 is formed from a solid-state drive (SSD) or a magnetic drive. Additionally or alternatively, the cache memory 106-1 may be formed from volatile memory while the memory 112 is formed from nonvolatile memory. The memory 112 may also server as lower-layer cache memory relative to the cache memory 106-2 for another memory 112 (not shown). Further, the memory 112 may include storage-class memory.

In some implementations, the host device 102 and the memory device 122 are realized on a same integrated circuit (IC) chip, such as on a system-on-chip (SoC). In other implementations, the host device 102 and the memory device 122 are realized on or as separate integrated circuit (IC) chips. In other words, the host device 102 may include at least one IC chip, and the memory device 122 may include at least one other IC chip. These chips may be in a same package or module, may be in separate packages or modules, may be mounted on a same printed circuit board (PCB), may be disposed on separate PCBs, and so forth. In each of these multichip environments, the interconnect 110 can provide an inter-chip coupling between the host device 102 and the memory device 122.

An interconnect 110 can operate in accordance with one or more standards to enable communication with a standards-compatible memory device 122. Example standards include a DRAM standard published by JEDEC (e.g., DDR, DDR2, DDR3, DDR4, DDR5, etc.); a stacked memory standard, such as one for High Bandwidth Memory (HBM) or Hybrid Memory Cube (HMC); a peripheral component interconnect (PCI) standard, such as the Peripheral Component Interconnect Express (PCIe) standard; a storage area network (SAN) standard; the Compute Express Link (CXL) standard; the HyperTransport™ standard; the InfiniBand standard; and the External Serial AT Attachment (eSATA) standard. In addition or in alternative to a wired connection, the interconnect 110 may be or may include a wireless connection, such as a connection that employs cellular, wireless local area network (WLAN), wireless personal area network (WPAN), or passive network standard protocols. The memory device 122 can be implemented as a memory card that supports the host device 102 across the interconnect 110. Although only one memory device 122 is shown, a given host device 102 may be coupled to multiple memory devices 122 using one or multiple interconnects 110.

Figures 1, 2:
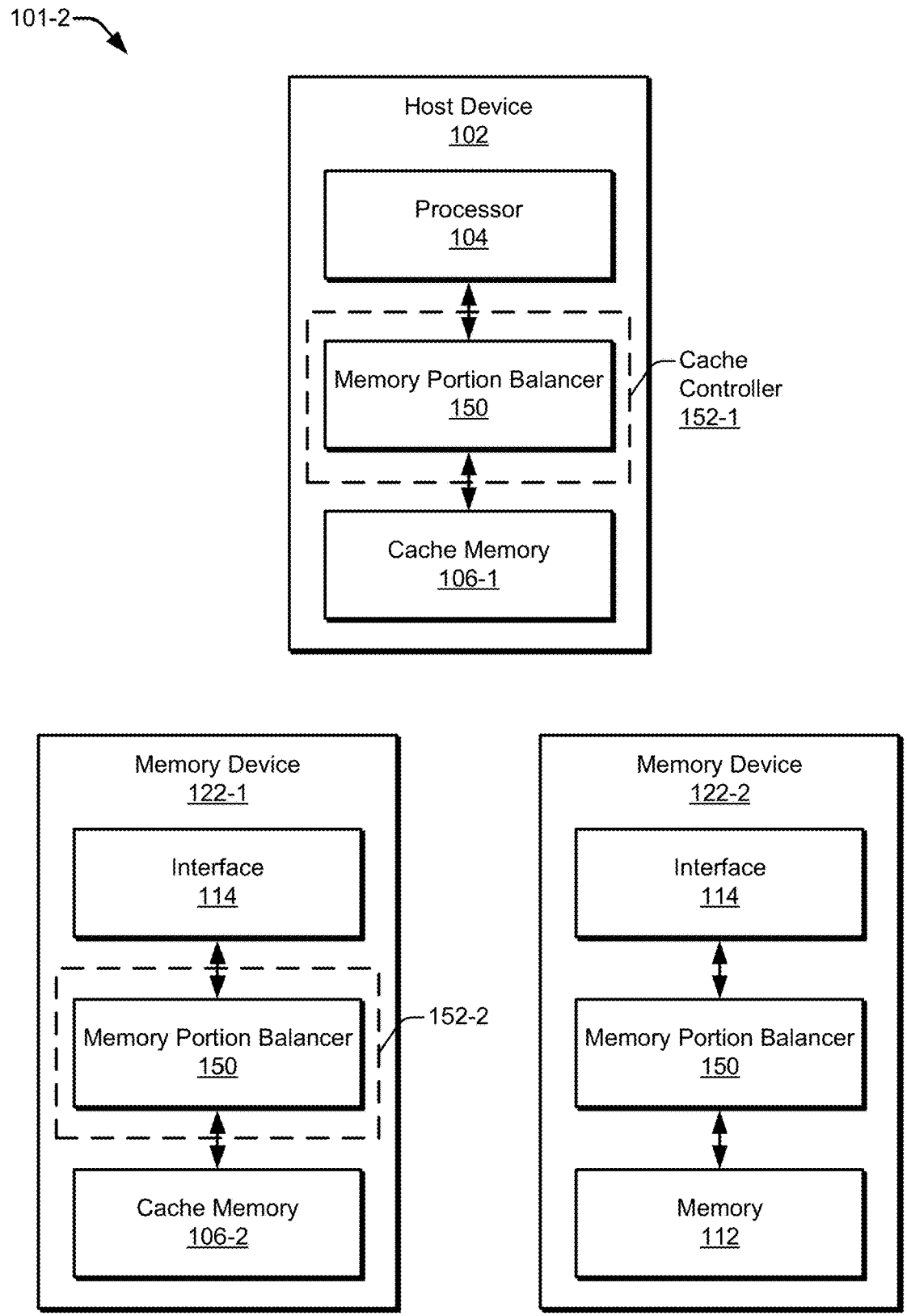

FIG. 1-2 illustrates, generally at 101-2, example "discrete" implementations of a memory portion balancer 150 that can be included in different individual devices. The memory portion balancer 150 includes at least a portion of the circuitry that is described herein to implement balancing memory-portion accesses. Example implementations of a memory portion balancer 150 are described below with reference to FIGS. 2-1 and 2-2. At the upper portion of FIG. 1-2, a host device 102 is depicted as having a memory portion balancer 150 coupled between the processor 104 and the cache memory 106-1. In some cases, the memory portion balancer 150 may be implemented as part of a cache controller 152-1. In the host device 102, the memory portion balancer 150 can accept a memory address from the processor 104 and provide a shuffled memory address to the cache memory 106-1 to balance memory-portion accesses.

At the lower-left portion of FIG. 1-2, a memory device 122-1 includes a memory portion balancer 150 coupled between the interface 114 and the cache memory 106-2. The memory portion balancer 150 of the memory device 122-1 may be implemented as part of a cache controller 152-2. In the memory device 122-1, the memory portion balancer 150 can accept a memory address from the interface 114 and provide a shuffled memory address to the cache memory 106-2.

At the lower-right portion of FIG. 1-2, a memory device 122-2 includes a memory portion balancer 150 coupled between the interface 114 and the memory 112. In the memory device 122-2, the memory portion balancer 150 can accept a memory address from the interface 114 and provide a shuffled memory address to the memory 112. Although particular component arrangements are depicted in FIG. 1-2, devices may be implemented in alternative manners. For example, a memory portion balancer 150 can be coupled between a cache memory 106-2 and a memory 112 of a memory device 122. In addition or in the alternative to the "discrete" implementations described above with reference to FIG. 1-2, a "distributed" implementation of a memory portion balancer 150 is described next.

Figures 1, 2, 3:
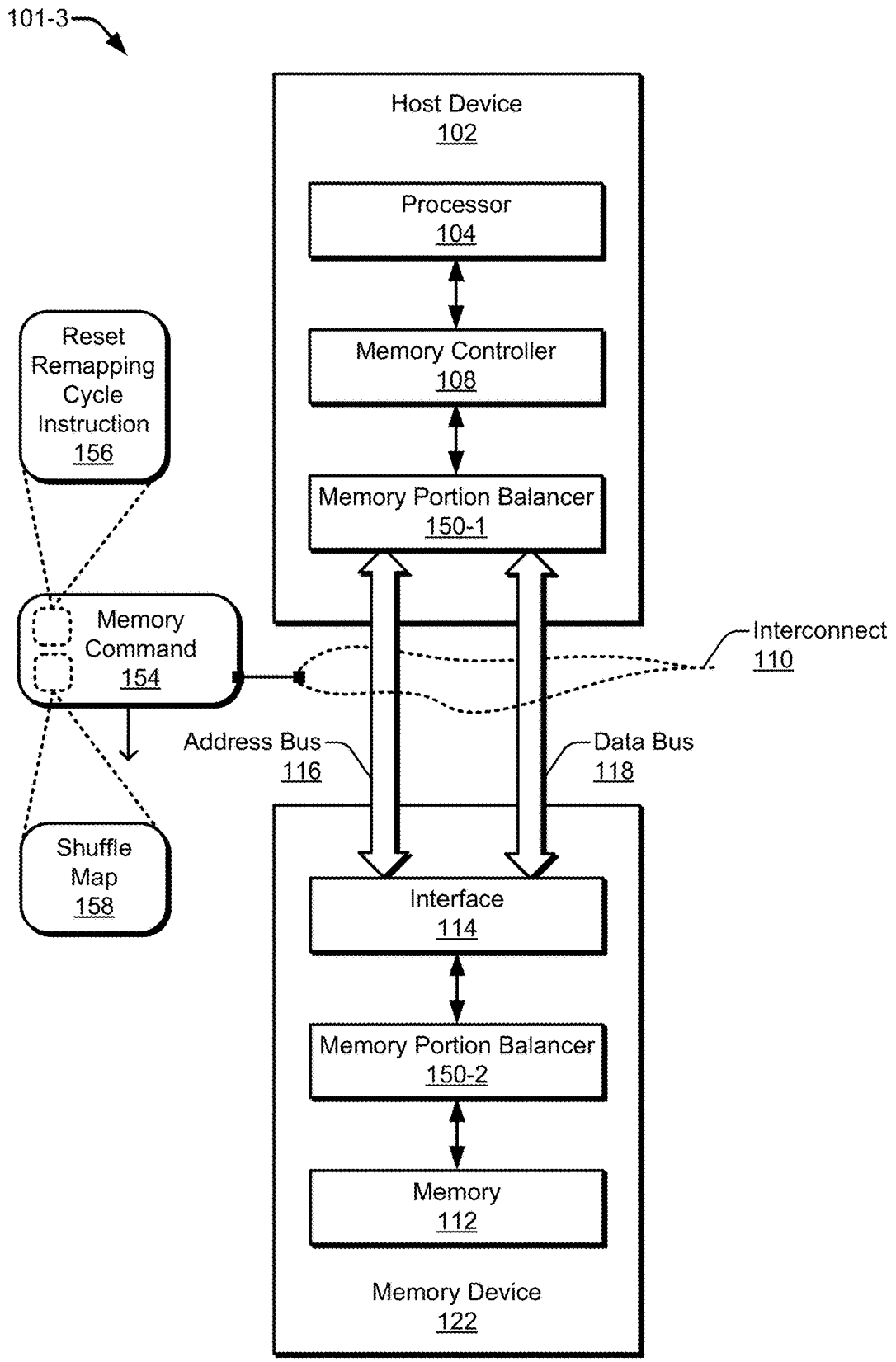
Figures 1, 2:
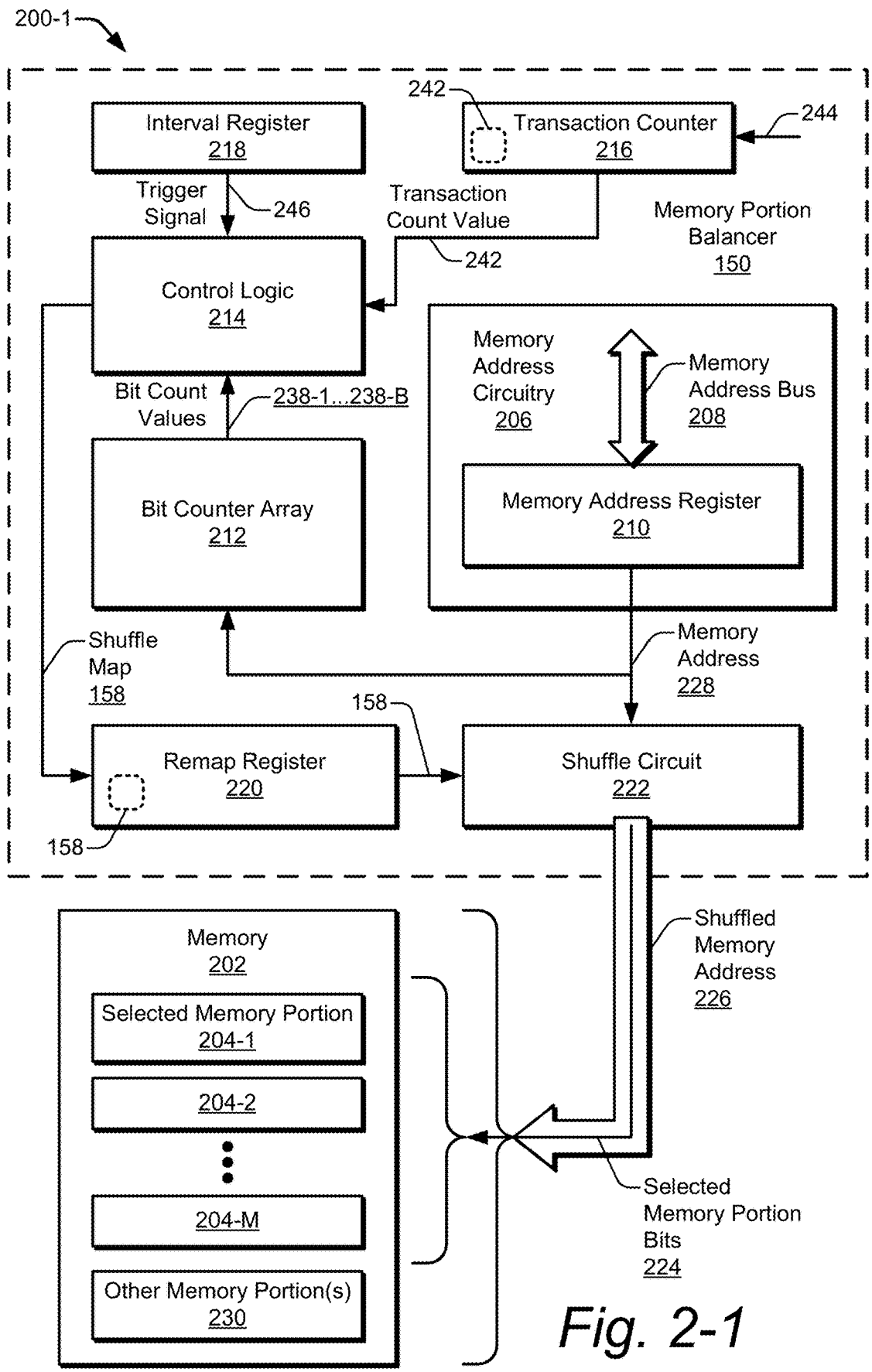
Figure 2:
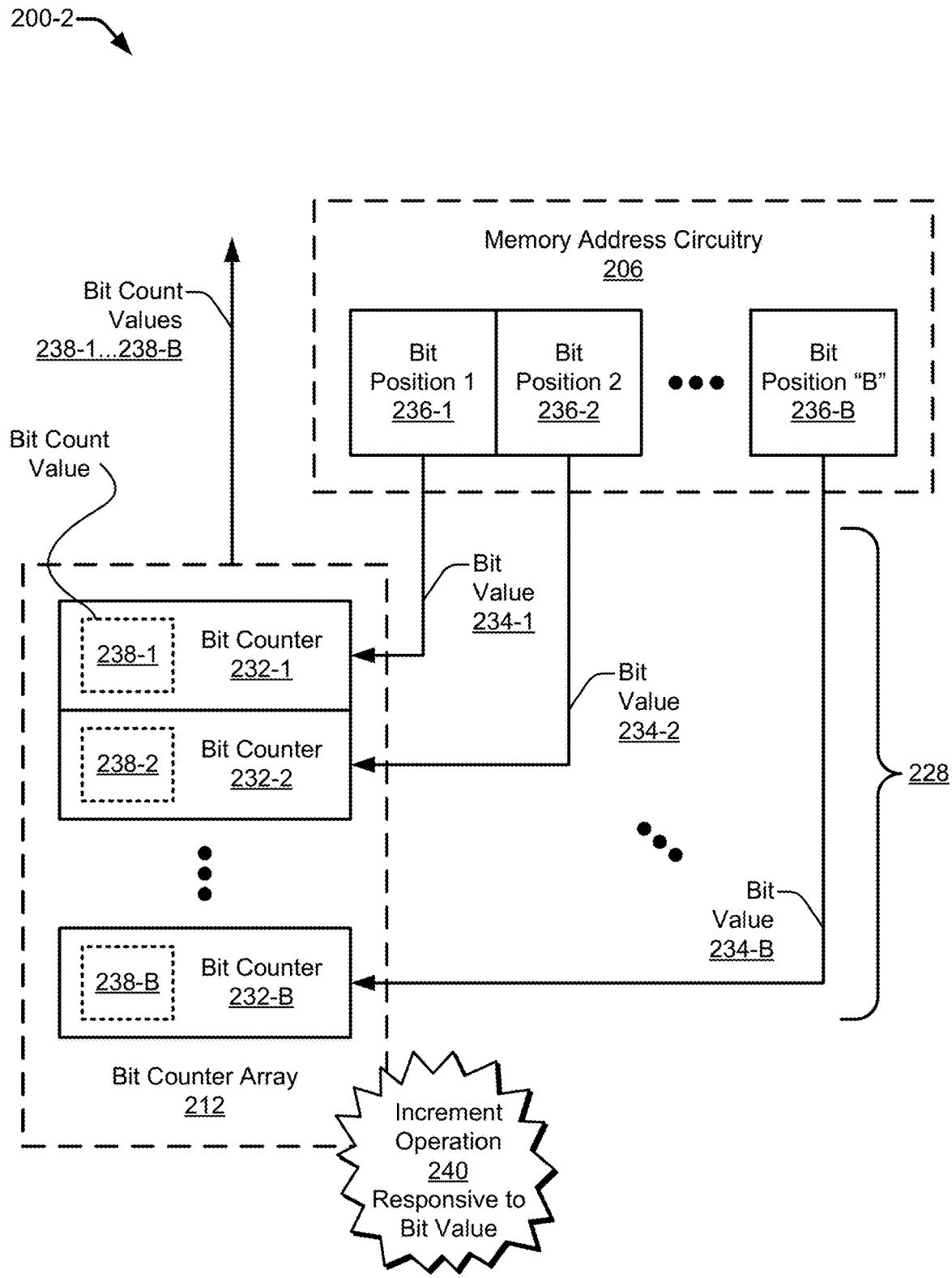
Figures 2, 3:
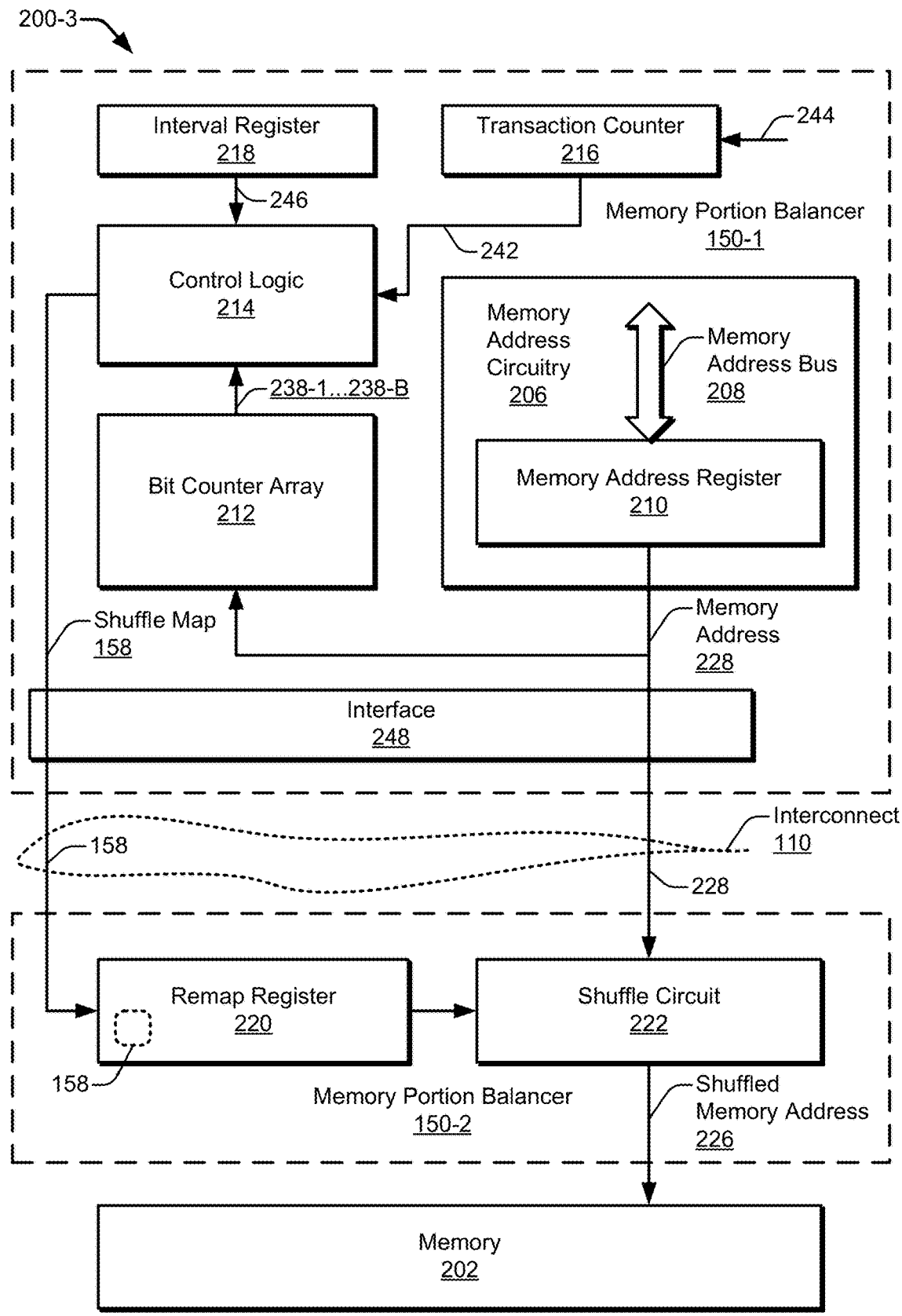
Figure 3:
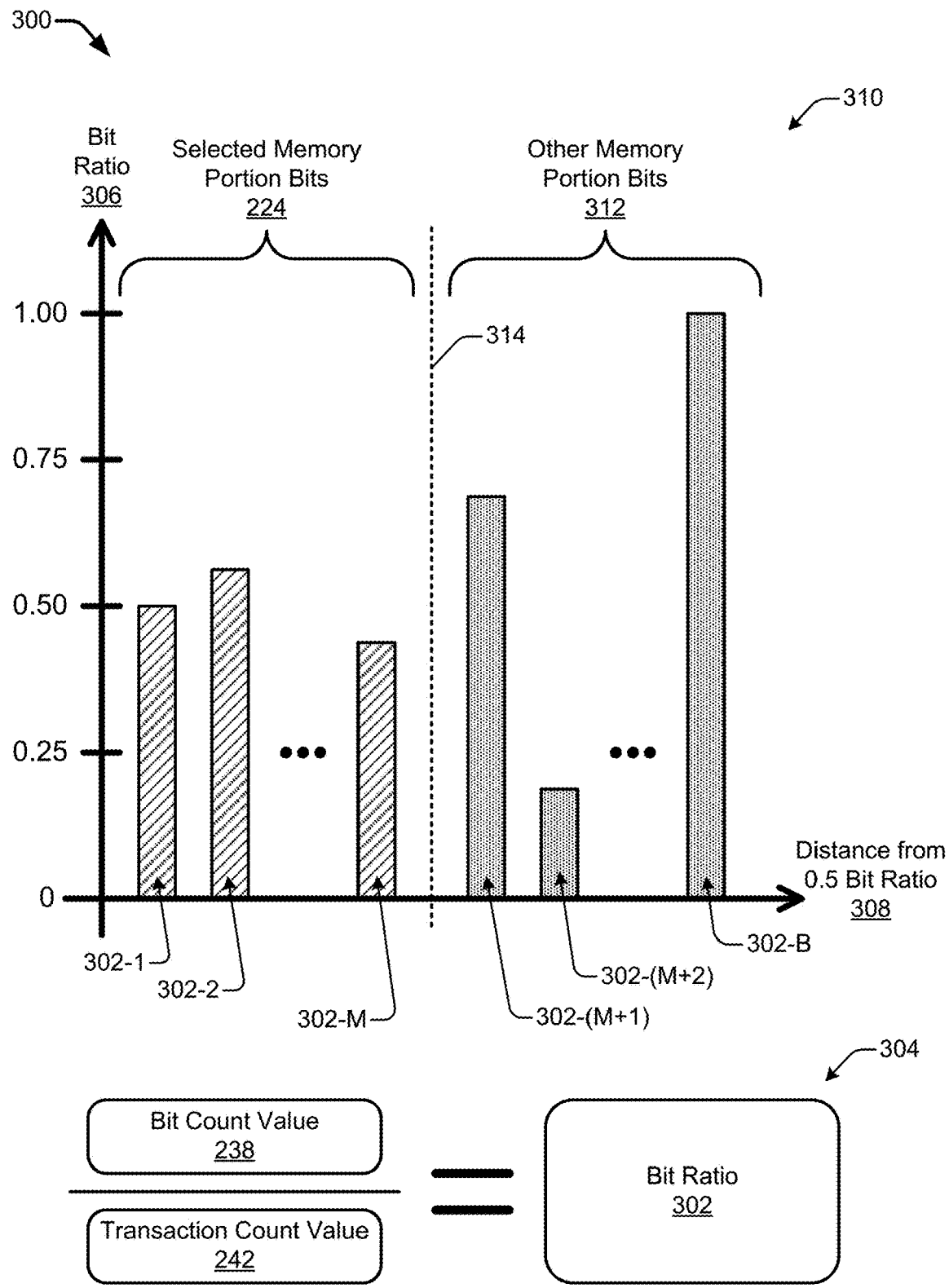

FIG. 1-3 illustrates, generally at 101-3, example "distributed" implementations of a memory portion balancer 150 that is included across a host device 102 and a memory device 122. In this example, a memory portion balancer 150 is separated into a first memory portion balancer part 150-1 (or first part 150-1 of the memory portion balancer 150) and a second memory portion balancer part 150-2 (or second part 150-2 of the memory portion balancer 150). The host device 102 includes the first memory portion balancer part 150-1, and the memory device 122 includes the second memory portion balancer part 150-2. As shown, the first memory portion balancer part 150-1 is coupled between the memory controller 108 and the interconnect 110. The second memory portion balancer part 150-2 is coupled between the interface 114 and the memory 112. In other aspects, a cache memory 106-2 may be coupled between the second part 150-2 of the memory portion balancer 150 and the memory 112. An example allocation of circuitry between the first and second memory portion balancer parts 150-1 and 150-2 is described below with reference to FIG. 2-3.

In example operations, the host device 102 transmits at least one memory command 154 to the memory device 122 over the interconnect 110. For instance, the memory controller 108 or the first memory portion balancer part 150-1 may generate the memory command 154 and transmit the memory command 154 over the interconnect 110. The interface 114 or the second memory portion balancer part 150-2 receives the memory command 154 from the host device 102 via the interconnect 110. The memory command 154 can be propagated over the address bus 116, the data bus 118, a command bus, a combination thereof, and so forth. The memory command 154 can include or indicate a reset remapping cycle instruction 156. Additionally or alternatively, the memory command 154 can include or indicate a shuffle map 158. Examples of the shuffle map 158 are described below with reference to FIGS. 2-1, 2-2, and 3. Examples of the memory command 154 are described below with reference to FIG. 5.

Example Techniques and Hardware for Balancing Memory-Portion Accesses

FIG. 2-1 illustrates, generally at 200-1, an example memory 202 that includes multiple selected memory portions 204-1 . . . 204-M and an example memory portion balancer 150 that includes memory address circuitry 206 and a bit counter array 212. As shown, the memory 202 includes a first selected memory portion 204-1, a second selected memory portion 204-2 . . . an "Mth" selected memory portion 204-M, where "M" represents a positive integer greater than one. The memory 202 also includes one or more other memory portions 230.

In some cases, the selected memory portions 204 and the other memory portions 230 may represent addressable memory portions or portions that correspond to a segment or part of a memory address. Thus, at least part of the multiple selected memory portions 204-1 . . . 204-M may overlap at least part of the other memory portions 230. For example, a given byte of the memory 202 may be part of a selected memory portion 204 and part of one of the other memory portions 230. In some cases, the multiple selected memory portions 204-1 . . . 204-M can correspond to those portions of the memory 202 that contribute to higher memory performance responsive to being accessed in a roughly balanced manner. In a cache-based hierarchical memory system, for instance, the multiple selected memory portions 204-1 . . . 204-M may therefore correspond to cache sets, and the other memory portions 230 may correspond to cache ways. In a multibank memory system, the multiple selected memory portions 204-1 . . . 204-M may therefore correspond to memory banks, and the other memory portions 230 may correspond to memory rows or memory columns.

In example implementations, the memory portion balancer 150 includes the memory address circuitry 206, at least one bit counter array 212, control logic 214, at least one transaction counter 216, at least one interval register 218, at least one remap register 220, and at least one shuffle circuit 222. The memory address circuitry 206 can be realized with at least one memory address bus 208 or at least one memory address register 210. Given this description, and as is explained hereinbelow, the memory address circuitry 206 can therefore also be realized with at least one memory address bus 208 and at least one memory address register 210 based on a nonexclusive interpretation of the disjunction "or." The memory address circuitry 206 provides a memory address 228 from the memory address register 210 that is holding the memory address 228 or from the memory address bus 208 that is propagating the memory address 228.

As shown, the memory address circuitry 206 is coupled to the shuffle circuit 222 and the bit counter array 212. The memory address circuitry 206 can provide the memory address 228 to the shuffle circuit 222 and the bit counter array 212. The bit counter array 212 includes multiple bit counters, which are illustrated in FIG. 2-2. The bit counter array 212 accumulates multiple bit count values 238-1 . . . 238-B based on a reference bit value and responsive to bit values of multiple bit positions across multiple instances of the memory address 228 over time. Here, the variable "B" can represent a positive integer, such as the number of bits in each memory address 228 (e.g., 32 or 64 bits). Alternatively, the variable "B" may correspond to a positive integer that is less than the number of bits in each memory address 228. Example operation of the bit counter array 212 in conjunction with the memory address circuitry 206 to produce multiple bit count values 238-1 . . . 238-B is described below with reference to FIG. 2-2.

The control logic 214 is coupled to the bit counter array 212, the transaction counter 216, the interval register 218, and the remap register 220. The transaction counter 216 counts a number of memory transaction requests 244 in each remapping cycle, which refers to a period during which a same shuffle map 158 is used for shuffling memory addresses. Thus, the transaction counter 216 stores a transaction count value 242 and provides the transaction count value 242 to the control logic 214. The interval register 218 operates as a timer to establish a length of each remapping cycle, which length can be programmable. The interval period can be established to be sufficiently short to account for changing execution behaviors of different pieces of code but sufficiently long to avoid performing the remapping overhead (e.g., flushing a cache) too frequently.

The interval register 218 and associated circuitry can count down an interval period until the interval period expires. Upon expiration of the interval period, the interval register 218 triggers the control logic 214 with a trigger signal 246. Alternatively, instead of using a timed interval period, the interval can correspond to a set number of memory transactions, which can also be programmable. With a transaction-based interval, the interval register 218 can issue the trigger signal 246 based on a comparison between the set number of memory transactions and the current transaction count value 242. Responsive to activation of the trigger signal 246 by the interval register 218, the control logic 214 updates a shuffle map 158.

In example operations, the control logic 214 determines the shuffle map 158 based on multiple bit ratios that respectively correspond to multiple bit positions of the memory address 228. Each respective bit ratio of the multiple bit ratios is computed responsive to a respective bit count value 238 of the multiple bit count values 238-1 . . . 238-B for occurrences of a reference bit value (e.g., 0 or 1). Each respective bit ratio can also be based on the transaction count value 242 or a bit count value for an opposite reference value (e.g., 0 or 1, respectively). Determination of the shuffle map 158 using the multiple bit count values 238-1 . . . 238-B is described further with reference to FIGS. 2-2 and 3. The control logic 214 provides the determined shuffle map 158 to the remap register 220.

The remap register 220 therefore holds the shuffle map 158. The remap register 220 is coupled to the shuffle circuit 222 and provides the shuffle map 158 to the shuffle circuit 222. The shuffle circuit 222 receives or has access to the memory address 228 from the memory address circuitry 206 and receives or has access to the shuffle map 158 from the remap register 220. The shuffle map 158 includes one or more indications that map each bit position of a first or incoming memory address to a respective bit position of a second or outgoing memory address. The shuffle circuit 222 can therefore use the shuffle map 158 to map each bit position of the memory address 228 to a respective bit position of a shuffled memory address 226.

The shuffle circuit 222 can couple a data bit of any given incoming bit position of the memory address 228 to a designated outgoing bit position of the shuffled memory address 226. The shuffle map 158 of the remap register 220 designates the mapping between incoming and outgoing bit positions. The shuffle circuit 222 can be implemented using, for example, multiple multiplexers. In a one-stage implementation, for a memory address 228 with "B" bits (with "B" representing a positive integer), "B" 1×B multiplexers can be used. In such cases, each respective incoming bit position is coupled to each outgoing position via a respective 1×B multiplexer. In such a multiplexer-based one-stage implementation, the remap register 220 is coupled to a control input of each 1×B multiplexer. In other implementations, the shuffle circuit 222 can be realized with one or more multiplexers, one or more switches, a multi-stage shuffle network, a shuffle-exchange network, a single- or multi-stage interconnect network, a Benes network, a butterfly network, networks with one or more stages or layers, some combination thereof, and so forth.

As described herein, the shuffling of the memory address 228 in accordance with the shuffle map 158 enables those bits positions of the memory address 228 that have bit values nearer a 50-50 split to be assigned or mapped to those bit positions of the shuffled memory address 226 that correspond to or address the multiple selected memory portions 204-1 . . . 204-M of the memory 202. These bit positions are referred to herein as selected memory portion bits 224. Thus, the shuffled memory address 226 includes selected memory portion bits 224 that address or correspond to the multiple selected memory portions 204-1 . . . 204-M. Example approaches to determining a shuffle map 158 using the multiple bit count values 238-1 . . . 238-B are described below with reference to FIG. 3, and example approaches to tracking the multiple bit count values 238-1 . . . 238-B are described next with reference to FIG. 2-2.

FIG. 2-2 illustrates, generally at 200-2, example memory address circuitry 206 and an example bit counter array 212 that can track bit count values. The memory address circuitry 206 includes a first bit position 236-1, a second bit position 236-2 . . . a "Bth" bit position 236-B. The "B" variable represents a positive integer that can be equal to or less than a quantity of bits in the memory address 228 that is provided by the memory address circuitry 206. Each respective bit position 236 provides a respective bit value 234 for the memory address 228. More specifically, the memory address 228 includes a first bit value 234-1 from the first bit position 236-1, a second bit value 234-2 from the second bit position 236-2 . . . a "Bth" bit value 234-B from the "Bth" bit position 236-B. Thus, the multiple bit positions 236-1 . . . 236-B respectively provide multiple bit values 234-1 . . . 234-B to the bit counter array 212. These multiple bit values 234-1 . . . 234-B can be provided for each memory address 228 across multiple memory addresses 228 over time, such as during each remapping cycle.

In example implementations, the bit counter array 212 can track at least one bit count value 238 corresponding to at least one bit position 236 across the multiple memory addresses 228 over time. To perform this tracking, the bit counter array 212 includes multiple bit counters 232-1 . . . 232-B. Each respective bit counter 232 accumulates a respective bit count value 238. More specifically, a first bit counter 232-1 tracks a first bit count value 238-1, a second bit counter 232-2 tracks a second bit count value 238-2 . . . a "Bth" bit counter 232-B tracks a "Bth" bit count value 238-B. In operation, each respective bit counter 232 can increment a corresponding bit count value 238 responsive to the respective bit value 234 and based on a reference bit value. If, for example, the reference bit value is "1," then a given bit counter 232 increments each time the bit value 234 of the corresponding bit position 236 of the memory address 228 is a "1."

Each bit count value 238 of the multiple bit count values 238-1 . . . 238-B therefore represents how many times one of the two binary bit values has occurred during a current remapping cycle. Multiple bit ratios using the multiple bit count values 238-1 . . . 238-B can be computed based on the transaction count value 242 (e.g., of FIGS. 2-1 and 3). The bit ratios can be used to determine the shuffle map 158 by ranking the multiple bit ratios. This bit ratio ranking and shuffle map determination is described with reference to FIG. 3. First, however, a distributed implementation of the memory portion balancer 150 is described next.

FIG. 2-3 illustrates, at 200-3 generally, an example distributed memory portion balancer 150 that is separated into two parts 150-1 and 150-2. With reference also to FIG. 1-3, the first part 150-1 of the memory portion balancer 150 can be included as part of the host device 102, and the second part 150-2 of the memory portion balancer 150 can be included as part of the memory device 122. The first part 150-1 includes the memory address circuitry 206, the bit counter array 212, the control logic 214, the transaction counter 216, and the interval register 218. The first part 150-1 of the memory portion balancer 150 can also include an interface 248 for coupling to the interconnect 110. The interface 248 can instead be a separate part of the host device 102.

The second part 150-2 of the memory portion balancer 150 includes the remap register 220 and the shuffle circuit 222. Via the interface 248 and over the interconnect 110, the first part 150-1 transmits the shuffle map 158 to the remap register 220 of the second part 150-2. The first part 150-1 also transmits the memory address 228 to the shuffle circuit 222 of the second part 150-2 using the interface 248 and the interconnect 110. Using the received shuffle map 158, which is stored at the remap register 220, the shuffle circuit 222 can produce the shuffled memory address 226 from the received memory address 228. The memory device 122 then accesses the memory 202 using the shuffled memory address 226.

FIG. 3 illustrates an example approach 300 to analyzing bit count values 238 tracked from bit positions 236 (e.g., of FIG. 2-2) across multiple memory addresses 228 over time to determine multiple bit ratios 302. In example implementations, a bit value relationship 304 is set forth for a bit ratio 302. The illustrated bit ratio 302 is based on a respective bit count value 238 and the transaction count value 242. For instance, the bit ratio 302 may be computed by, for a given bit position 236, dividing a corresponding bit count value 238 by the transaction count value 242. More generally, for a respective bit position 236 of multiple bit positions 236-1 . . . 236-B, a corresponding respective bit ratio 302 of multiple bit ratios 302-1 . . . 302-B may be computed by dividing a respective bit count value 238 of multiple bit count values 238-1 . . . 238-B by the transaction count value 242. The multiple bit ratios 302 are then ranked relative to a reference bit ratio, as shown in a graph 310.

The graph 310 includes an abscissa axis 308 (the "x" axis) that corresponds to a distance from a 0.5 reference bit ratio and an ordinate axis 306 (the "y" axis) that corresponds to a computed bit ratio 302 for each respective bit position 236. The ordinate axis 306 extends from 0 to 1.00, with indicators explicitly depicted at 0.25, 0.50, and 0.75. The abscissa axis 308 includes "B" entries for "B" bit ratios 302-1 . . . 302-B. A first bit ratio 302-1, a second bit ratio 302-2 . . . an "Mth" bit ratio 302-M, an "(M+1)th" bit ratio 302-(M+1), an "(M+2)th" bit ratio 302(M+2) . . . and a "Bth" bit ratio 302-B are explicitly shown.

In the example represented by the graph 310, the bit ratio 302 is computed based on a respective bit count value 238 and the transaction count value 242, as shown by the example bit value relationship 304. Here, the bit ratio 302 therefore represents a percentage of total instances that a reference bit value occurs across those total memory transactions. To focus on providing a 50-50 split between the two binary values of "0" and "1" to thereby balance memory accesses across two or more memory portions, the reference bit ratio in this instance is 0.5. The bit ratios 302-1 . . . 302-B are thus ranked by proximity to 0.5. In other words, those bit ratios 302 that are relatively closer to 0.5 are ranked together. In the graph 310, these higher-ranked bit ratios 302 are depicted closer to the ordinate axis 306 on the left. It should be understood that, at least in this context, the first and second bit ratios 302-1 and 302-2 do not necessarily correspond to the first and second bit positions 236-1 and 236-2 (of FIG. 2-2), unless these two bit positions just happen to have bit values 234 that are closest to a 50-50 split over a given remapping cycle.

The multiple selected memory portions 204-1 . . . 204-M (of FIG. 2-1) are addressed by, and correspond to, the selected memory portion bits 224, which are also indicted in the graph 310. The other memory portions 230 (also of FIG. 2-1) are addressed by, and correspond to, the other memory portion bits 312 as indicated in the graph 310. A demarcation between the two subsets of bits is provided by a line 314. With "M" memory portions of the multiple selected memory portions 204-1 . . . 204-M, there are "M" bit ratios 302-1 . . . 302-M assigned to the selected memory portion bits 224. There may be as many as "B-M" bits assigned to the other memory portion bits 312.

Each respective bit ratio 302 of the multiple bit ratios 302-1 . . . 302-B represents or corresponds to a respective bit position 236 of the multiple bit positions 236-1 . . . 236-B of each memory address 228 (although not necessarily in the same order as noted above). The ranking of the multiple bit ratios 302-1 . . . 302-B therefore likewise ranks the multiple bit positions 236-1 . . . 236-B for assignment to the remapping of memory-address bit positions. In other words, to rank the multiple bit ratios 302 is to produce a ranking of corresponding bit positions of the multiple bit positions 236 of each memory address 228. In cache memory implementations, the higher-ranked, selected memory-address bit positions can correspond to the cache sets of the cache memory. In multibank memory implementations, the higher-ranked, selected memory-address bit positions can correspond to the memory banks of the multibank memory.

In the depicted example approach 300 that is described above, each respective bit ratio 302 of the multiple bit ratios 302-1 . . . 302-B is computed based on the transaction count value 242 and the respective bit count value 238 of the respective bit position 236 of the multiple bit positions 236-1 . . . 236-B of each memory address 228. Generally, each respective bit ratio 302 of the multiple bit ratios 302-1 . . . 302-B is based on a comparison of a relative quantity of occurrences across the multiple memory addresses 228 over time of the reference bit value (e.g., 1 or 0) versus an opposite reference bit value (e.g., 0 or 1, respectively) at each respective bit position 236 of the multiple bit positions 236-1 . . . 236-B of each memory address 228. Thus, instead of being computed based on the transaction count value 242, the relative quantity of occurrences of binary bit values can be computed using an alternative approach.

In an example alternative approach, each bit ratio 302 is computed based on a bit count value 238 corresponding to a reference bit value and another bit count value corresponding to the opposite bit value. Each respective bit ratio 302 may therefore be computed by dividing the respective bit count value 238 of the reference bit value (e.g., a "1") by another bit count value (not shown) of the opposite bit value (e.g., a "0"). In this case, the 50-50 split of binary values to achieve balanced memory accessing is represented by, and corresponds to, a 1:1 or 1.0 bit ratio. With this alternative approach, the reference bit ratio by which bit ratios are ranked based on proximity is therefore 1.0. In other words, those bit ratios 302-1 . . . 302-M that are closest to 1.0 can be assigned to the selected memory portion bits 224 to the left of the line 314. The respective other bit count value for each respective bit ratio 302 can be obtained by including a respective second bit counter in a bit counter array for each respective bit position 236 or by subtracting the respective bit count value 238 from the transaction count value 242.

Figures 1, 4:
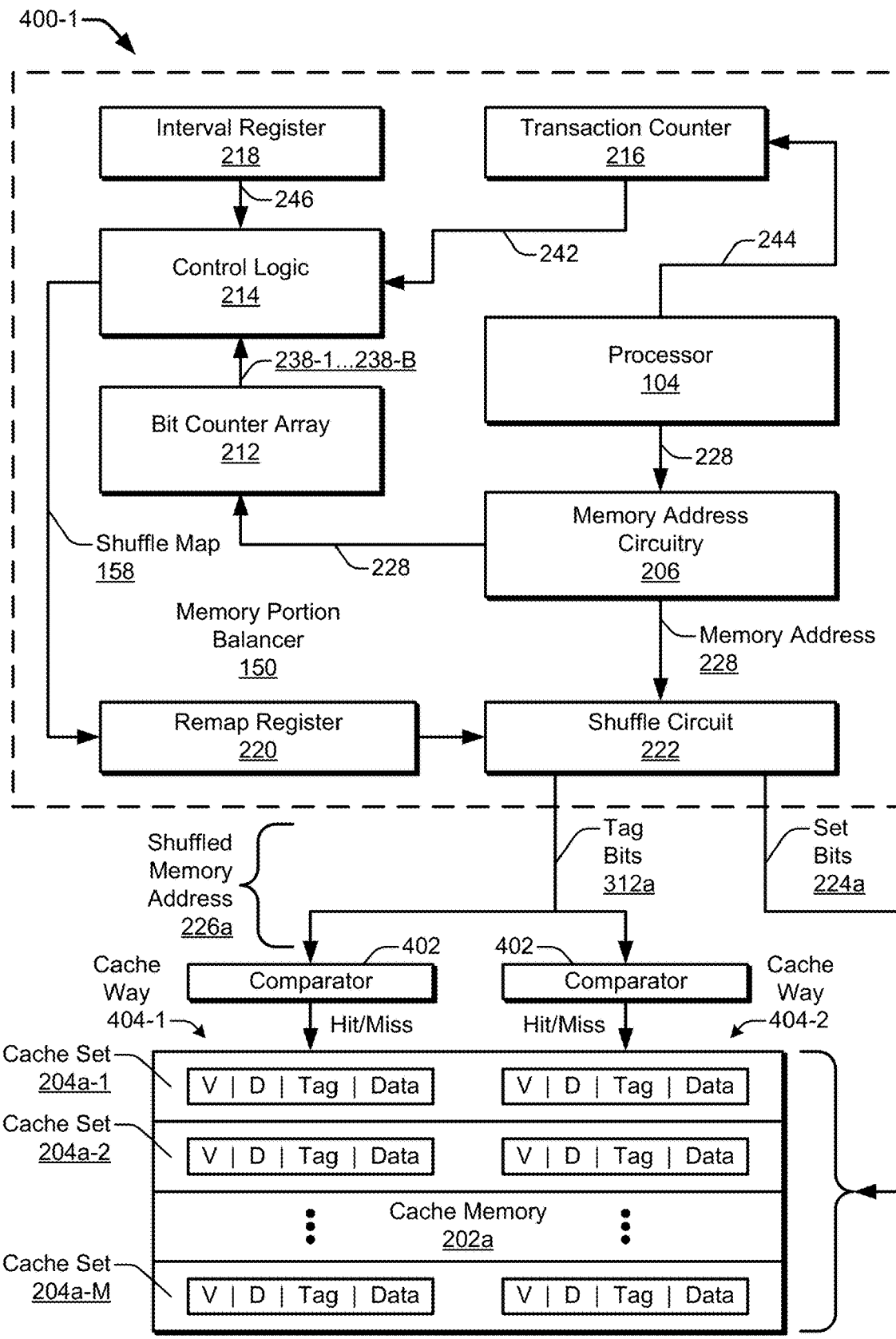
Figures 2, 4:
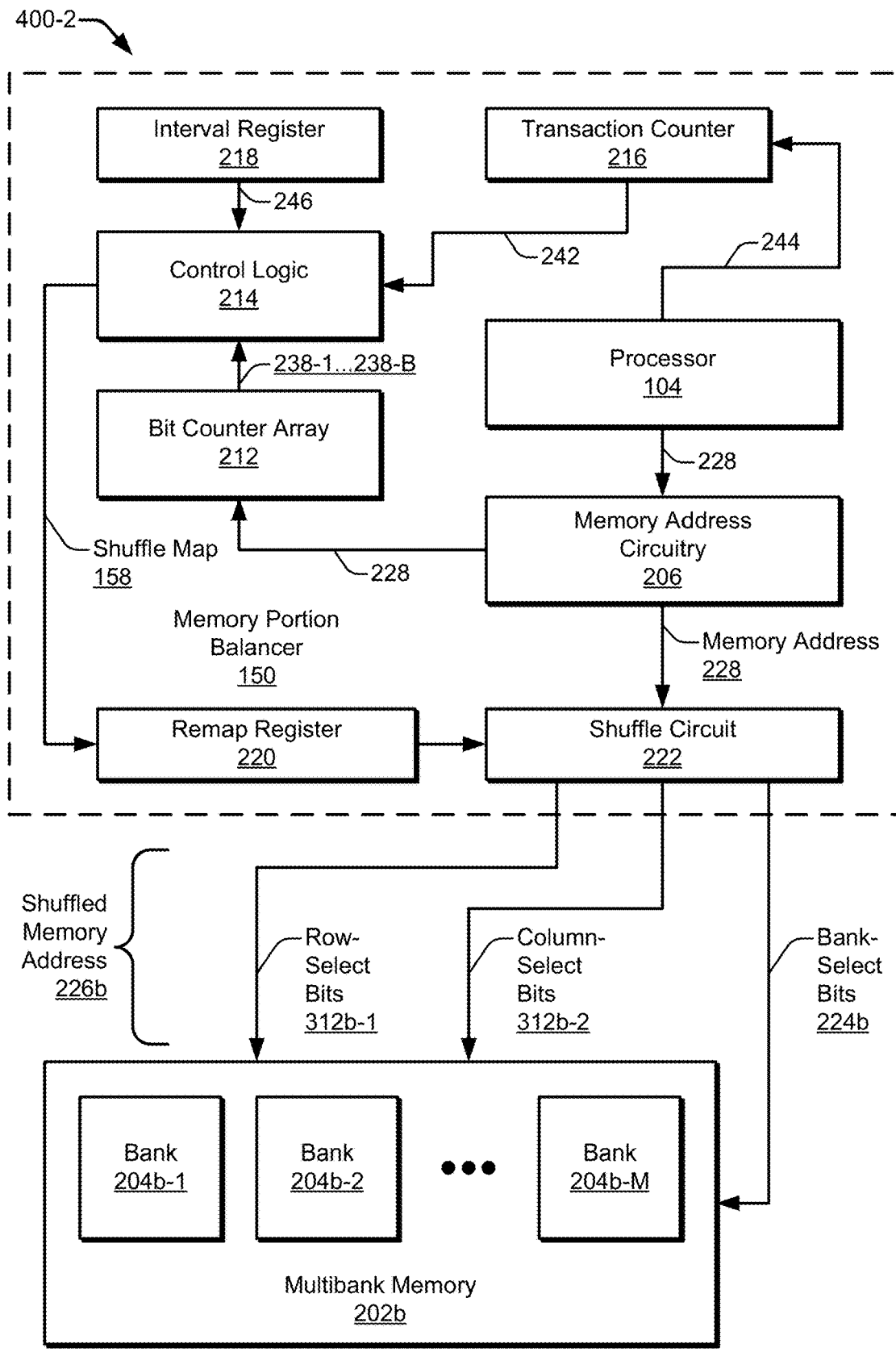

FIG. 4-1 illustrates an example implementation 400-1 for balancing memory-portion accesses in a hierarchical memory architecture with a cache memory 202a in which the multiple selected memory portions are realized as multiple cache sets 204a-1 . . . 204a-M. More specifically, the cache memory 202a includes a first cache set 204a-1, a second cache set 204a-2 . . . an "Mth" cache set 204a-M. The cache memory 202a also includes multiple cache ways, including a first cache way 404-1 and a second cache way 404-2 for a two-way set-associative cache memory example. The cache memory 202a may, however, have a different quantity of cache ways.

As shown for this example, each cache set 204 includes two cache lines, one cache line per cache way 404. Each cache line includes data and an associated tag that holds tag bits for the corresponding cached data. Each cache line may also include one or more status or flag bits, such as a valid bit (V) or a dirty bit (D). The cache memory 202a also includes, or is associated with, a comparator 402 per cache way 404 to determine a hit or miss (for a hit/miss signal) in a corresponding cache way 404 for an indexed cache set 204.

With reference also to FIG. 2-1, the memory 202 corresponds to the cache memory 202a for this example cache memory implementation 400-1. The multiple selected memory portions 204-1 . . . 204-M correspond to the multiple cache sets 204a-1 . . . 204a-M. Accordingly, the selected memory portion bits 224 (of FIGS. 2-1 and 3) of the shuffled memory address 226a correspond to set bits 224a (or set index bits 224a). The other memory portions 230 can correspond to the multiple cache ways 404-1 and 404-2. Thus, the other memory portion bits 312 (of FIG. 3) can correspond to tag bits 312a. Although not shown, the other memory portion bits 312 may also correspond to additional memory address bits, such as byte offset bits. Byte offset bits need not be tracked in the bit counters of FIG. 2-2. Implementing the memory portion balancer 150 in conjunction with the cache memory 202a as described herein can therefore balance memory accesses across the multiple cache sets 204a-1 . . . 204a-M to accelerate the accessing of the cache memory 202a by facilitating usage of a greater percentage of the cache sets.

FIG. 4-2 illustrates an example implementation 400-2 for balancing memory-portion accesses in a banked memory architecture with a multibank memory 202b in which the multiple selected memory portions are realized as multiple memory banks 204b-1 . . . 204b-M. More specifically, the multibank memory 202b includes a first bank 204b-1, a second bank 204b-2 . . . an "Mth" bank 204b-M. Although not explicitly shown, the multibank memory 202b can also include multiple rows and multiple columns in a memory array. The multibank memory 202b may, for instance, comprise at least part of a primary or secondary memory of a computing device.

With reference also to FIG. 2-1, the memory 202 corresponds to the multibank memory 202b for this example banked memory implementation 400-2. The multiple selected memory portions 204-1 . . . 204-M correspond to the multiple banks 204b-1 . . . 204b-M. Accordingly, the selected memory portion bits 224 (of FIGS. 2-1 and 3) of the shuffled memory address 226b correspond to bank-select bits 224b. The other memory portions 230 can correspond to rows or columns that are within a given bank or that extend across two or more banks. Thus, the other memory portion bits 312 (of FIG. 3) can correspond to row-select bits 312b-1 or column-select bits 312b-2. Although not shown, the other memory portion bits 312 may also correspond to additional memory address bits, such as channel-select bits. Alternatively, channel-select bits can be incorporated into the selected memory portion bits 224 (e.g., replacing or joining the bank-select bits 224b) to balance the accessing of multiple channels of the memory. Implementing the memory portion balancer 150 in conjunction with the multibank memory 202b as described herein can therefore balance memory accesses across the multiple banks 204b-1 . . . 204b-M to accelerate the accessing of the multibank memory 202b by facilitating parallel accessing of the banks.

Example Methods for Balancing Memory-Portion Accesses

Figure 5:
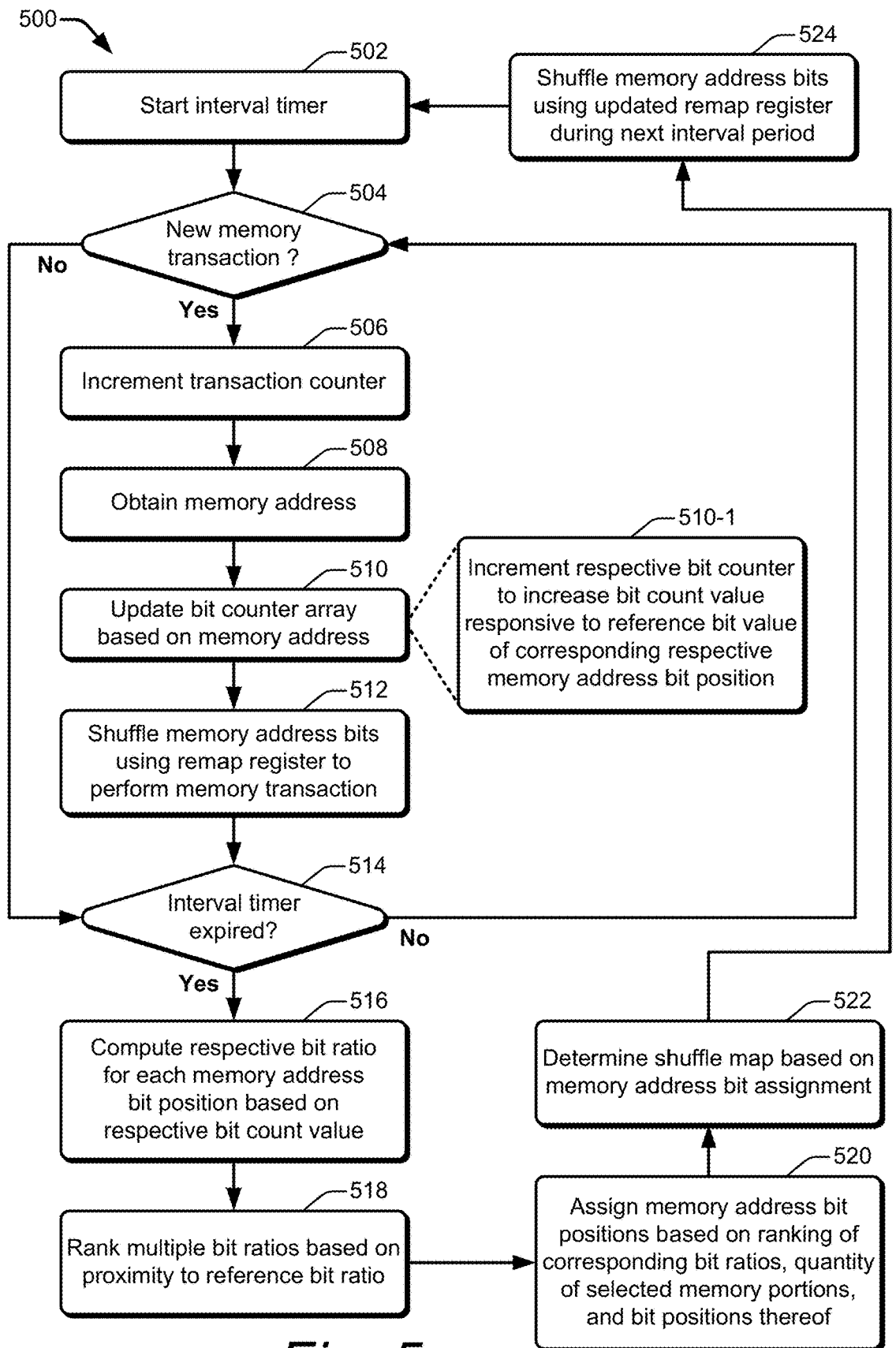
FIG. 5 illustrates an example flowchart depicting operations to be performed by a memory portion balancer using multiple bit ratios to determine a shuffle map for shuffling memory addresses.
Figure 6:
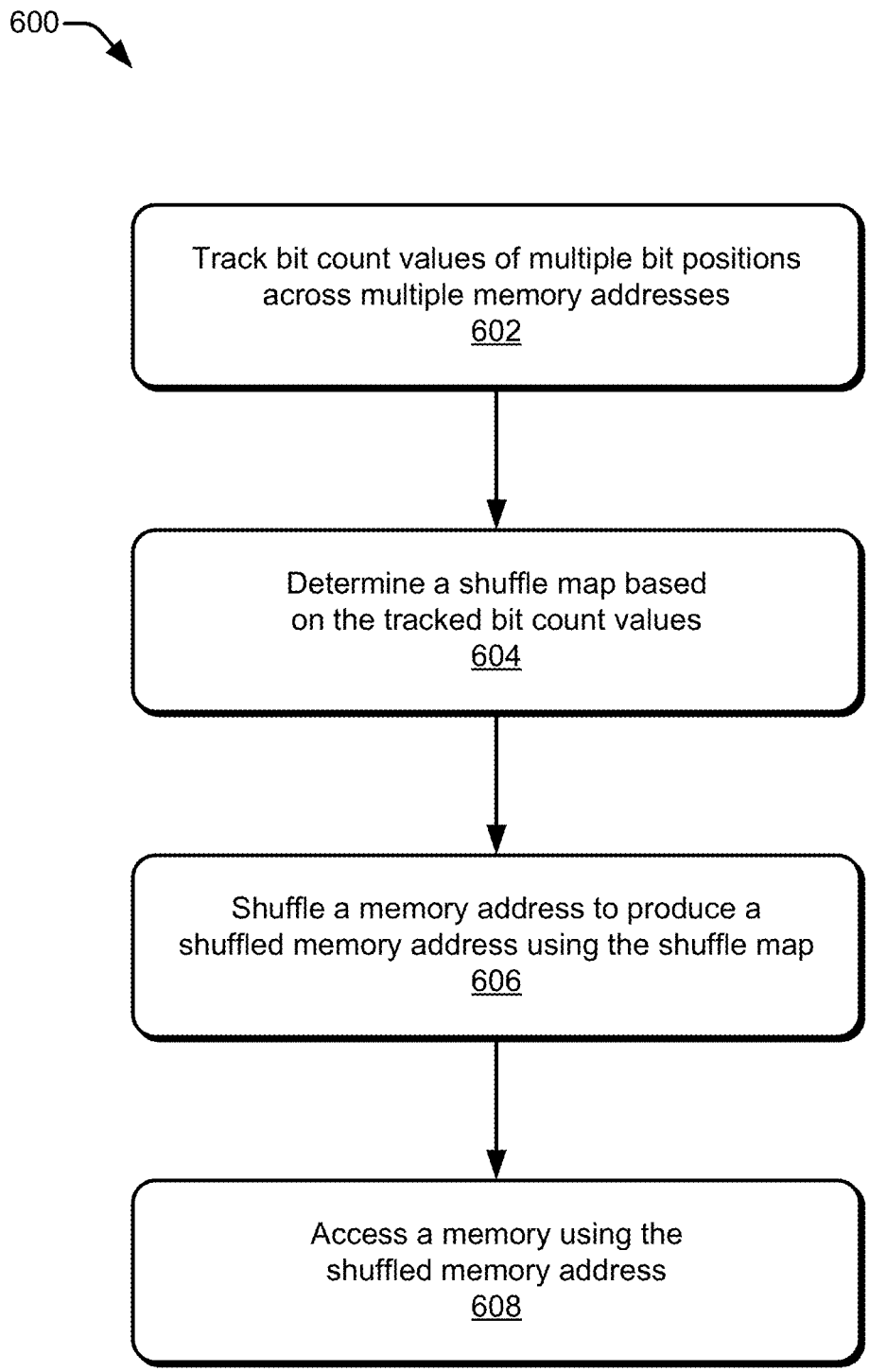
FIG. 6 illustrates example methods for an apparatus to balance memory-portion accesses.

Example methods are described in this section with reference to the flow chart and flow diagram of FIGS. 5 and 6. These descriptions reference components, entities, and other aspects depicted in FIGS. 1 through 4-2 by way of example only. FIG. 5 illustrates an example flowchart 500 depicting operations to be performed by an apparatus that includes a memory portion balancer 150 using multiple bit ratios to determine a shuffle map for shuffling memory addresses. The flowchart 500 includes thirteen blocks 502 to 524. At 502, an interval timer is started at the interval register 218. At 504, the memory portion balancer 150 determines if a new memory transaction has been requested—e.g., from a processor or host. If not, the flowchart continues at 514, which is described below.

If, on the other hand, it is determined that a new memory transaction has been requested at 504, then at 506 a transaction count value 242 is incremented at the transaction counter 216—e.g., responsive to a memory transaction request 244. At 508, a memory address 228 is obtained from the memory address circuitry 206. The memory portion balancer 150 updates the bit counter array 212 at 510 based on the memory address 228. At 510-1, a respective bit counter 232 may be incremented responsive to a reference bit value occurring at a corresponding respective bit position 236 of the memory address 228. The incrementing of the respective bit counter 232 enables a respective bit count value 238 to be tracked as described above with reference to FIG. 2-2.

At 512, the shuffle circuit 222 shuffles the bits of the memory address 228 to produce a shuffled memory address 226 using a shuffle map 158 held by the remap register 220.

The memory portion balancer 150 provides the shuffled memory address 226 to the memory 202 to enable the memory transaction request 244 to be handled by performing the memory transaction. At 514, the memory portion balancer 150 determines if the interval timer of the interval register 218 has expired. If not, then the process returns to 504 to determine if a new memory transaction request has been issued. If the interval timer has expired, then the process continues at 516 to prepare for a new remapping cycle.

At 516, the control logic 214 computes a respective bit ratio 302 for each memory address bit position 236 based on a respective bit count value 238. The computation may also be based on a transaction count value 242. The control logic 214 ranks multiple bit ratios 302-1 . . . 302-B based on proximity to a reference bit ratio at 518. The reference bit ratio may correspond, for example, to 0.5 or 1.0, depending on how each bit ratio is computed, as is described above with reference to FIG. 3. The ranking can identify those bit ratios, and thus those bit positions, that currently have a more balanced distribution—e.g., approximately a 50-50 bit value split—under the code that is being executed contemporaneously.

At 520, the control logic 214 assigns at least some of the memory address bit positions 236-1 . . . 236-B based on the ranking of the corresponding bit ratios 302-1 . . . 302-B, as is described above with reference to FIG. 3. The memory address bit positions 236-1 . . . 236-B of an incoming memory address 228 can also be assigned to bit positions of an outgoing shuffled memory address 226 based on a quantity "M" of the multiple selected memory portions 204-1 . . . 204-M (e.g., with "M" indicating how many address bits are relevant) and the bit positions that address these selected memory portions of the memory 202. Thus, those bit ratios that indicate a given bit position has a balanced distribution of 0s and 1s can be assigned to those bit positions that can enable the multiple selected memory portions 204-1 . . . 204-M to be accessed in a substantially balanced manner, at least relative to other memory portions 230 of the memory 202. Using this analysis and these factors, the control logic 214 can determine an updated shuffle map 158 at 522 based on the memory address bit assignment derived from the ranking of the multiple bit ratios 302-1 . . . 302-B.

Before the updated shuffle map 158 is activated (e.g., before the shuffle map 158 is stored in the remap register 220 or at least before the shuffle circuit 222 uses the updated shuffle map 158), the memory 202 can perform one or more actions to prepare for, or to reset for, the next remapping cycle. Generally, the memory 202 can clear the backlog or queue of existing memory requests before starting a new remapping cycle with a different shuffle map 158.

With a cache memory 202a implementation, for example, receipt of a reset remapping cycle instruction 156 can trigger performance of one or more of the following example actions. First, the cache memory 202a pauses and completes any pending cache requests. Second, the cache is flushed, and each of the lines is invalidated. Third, the remap register 220 is reprogrammed with the updated shuffle map 158, which can provide a new mapping of host physical-address bit positions to those address bit positions that are routed to the cache set bits and the cache tag bits. Fourth, the memory portion balancer 150 can reset the transaction counter 216 (e.g., to zero), can reset the interval register 218 (e.g., to the currently programmed timer period), and can reset the multiple bit counters 232-1 . . . 232-B (e.g., to zero).

These remapping-cycle reset operations can be started any time after an affirmative determination at 514, and the associated actions can be completed before starting the operation(s) of 524. As indicated at 524, the shuffling of memory address bits by the shuffle circuit 222 can commence with the updated remap register 220 having the updated shuffle map 158 during the next interval period.

FIG. 6 illustrates with a flow diagram 600 example methods for an apparatus to implement balancing memory-portion accesses. The flow diagram 600 includes four blocks 602 to 608. In example implementations, at least part of an apparatus 100 can perform the operations of the flow diagram 600.

At block 602, bit count values of multiple bit positions are tracked across multiple memory addresses. For example, a memory portion balancer 150 can track bit count values 238-1 . . . 283-B of multiple bit positions 236-1 . . . 236-B across multiple memory addresses 228. For instance, respective bit counters 232-1 . . . 232-B of a bit counter array 212 may be incremented responsive to a reference bit value being present at each of the respective bit positions 236-1 . . . 236-B such that the bit counter array 212 is counting occurrences of a given bit value (e.g., "1") at each of the memory bit addresses. The bit count values 238 may therefore be accumulated across multiple memory addresses 228 over time.

At block 604, a shuffle map is determined based on the tracking. For example, the memory portion balancer 150 can determine a shuffle map 158 based on the tracking. To do so, control logic 214 may rank bit ratios 302 that correspond to the bit count values 238 based on a proximity to a reference bit ratio, such as 0.5 or 1.0. Those bit ratios 302 that are relatively closer to the reference bit ratio may be assigned to those memory address bit positions that address the selected memory portions 204 that are relatively more sensitive to being accessed in a balanced manner. By assigning memory address bit positions using the tracking and ranking, the selected memory portions 204 that are addressed by those assigned memory address bit positions may be accessed with more equal percentages relative to each other (e.g., more balanced) than relative to other memory portions 230 (e.g., less balanced).

At block 606, a memory address is shuffled to produce a shuffled memory address using the shuffle map. For example, the memory portion balancer 150 can shuffle a memory address 228 to produce a shuffled memory address 226 using the shuffle map 158. In some cases, a bit value 234 at an incoming bit position 236 of the memory address 228 may be mapped to a different outgoing bit position of the shuffled memory address 226 based on one or more mapping indications in the shuffle map 158.

At block 608, a memory is accessed using the shuffled memory address. For example, a host device 102 or a memory device 122 can access a memory 202 using the shuffled memory address 226. This may entail, for instance, applying at least selected memory portion bits 224 of the shuffled memory address 226 to selected memory portions 204 of a cache memory 202a or a multibank memory 202b. The memory accessing may include transmitting a shuffle map 158 and the memory address 228 across an interconnect 110 in a "distributed" memory portion balancer implementation or transmitting the shuffled memory address 226 across the interconnect 110 in a "discrete" memory portion balancer implementation.

For the flow chart and flow diagram described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, or some combination thereof. The methods may be realized using one or more of the apparatuses or components shown in FIGS. 1 to 4-2, the components of which may be further divided, combined, rearranged, and so on. The devices and components of these figures generally represent hardware, such as electronic devices, packaged modules, IC chips, or circuits; firmware or the actions thereof; software; or a combination thereof. With reference to FIGS. 1-1 to 1-3, in some cases, a host device 102 or a memory device 122 may individually perform the operations of these methods. In other cases, a host device 102 and a memory device 122 may jointly perform the operations. FIGS. 2-1 to 2-3 illustrate example circuitry for a memory portion balancer 150 that may perform at least some of these operations. FIG. 3 illustrates an example approach to bit-count-value analysis that can be used to determine a shuffle map 158. FIGS. 4-1 and 4-2 illustrate two example memory implementations: a cache memory implementation and a multibank memory implementation, respectively. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although implementations for balancing memory-portion accesses have been described in language specific to certain features and/or methods, the subject of the appended claims is not necessarily limited to the specific features or methods described. Rather, the specific features and methods are disclosed as example implementations for balancing memory-portion accesses.

The invention claimed is:

1. An apparatus comprising:
    memory address circuitry configured to provide multiple memory addresses;
    a bit counter array coupled to the memory address circuitry and including multiple bit counters, the bit counter array configured to track multiple bit count values corresponding to multiple bit positions across the multiple memory addresses, each respective bit counter of the multiple bit counters configured to increment a respective bit count value of the multiple bit count values responsive to a reference bit value occurring across the multiple memory addresses at a respective bit position of the multiple bit positions of each memory address; and
    control logic coupled to the bit counter array, the control logic configured to determine a shuffle map based on multiple bit ratios, each respective bit ratio of the multiple bit ratios based on the respective bit count value of the respective bit counter of the multiple bit counters of the bit counter array.

2. The apparatus of claim 1, wherein the control logic is configured to determine the shuffle map to substantially balance accesses to selected memory portions of a memory.

3. The apparatus of claim 2, wherein the control logic is configured to determine the shuffle map by assigning bit positions of the multiple memory addresses that have bit values that are balanced over time to bit positions of shuffled memory addresses that correspond to the selected memory portions of the memory.

4. The apparatus of claim 1, wherein:
    the apparatus comprises a host device; and
    the host device comprises a memory portion balancer, the memory portion balancer including at least the bit counter array and the control logic.

5. The apparatus of claim 4, wherein the memory portion balancer of the host device comprises:
    a shuffle circuit coupled to the memory address circuitry and the control logic, the shuffle circuit configured to shuffle a memory address to produce a shuffled memory address using the shuffle map.

6. The apparatus of claim 1, wherein the control logic is configured to determine the shuffle map based on the multiple bit count values corresponding to the multiple bit positions across the multiple memory addresses and on memory address bit positions that correspond to multiple cache sets of a cache memory.

7. The apparatus of claim 1, wherein the control logic is configured to determine the shuffle map based on the multiple bit count values corresponding to the multiple bit positions across the multiple memory addresses and on memory address bit positions that correspond to multiple memory banks of a multibank memory.

8. The apparatus of claim 1, wherein the control logic is configured to:
    rank the multiple bit ratios to produce a ranking of corresponding bit positions of the multiple bit positions of each memory address; and
    determine the shuffle map based on the ranking of the corresponding bit positions.

9. The apparatus of claim 8, wherein the control logic is configured to rank each respective bit ratio of the multiple bit ratios to produce the ranking of the corresponding bit positions based on a respective proximity to a reference bit ratio.

10. The apparatus of claim 8, wherein each respective bit ratio of the multiple bit ratios is based on a comparison of a relative quantity of occurrences across the multiple memory addresses of the reference bit value versus an opposite bit value at each respective bit position of the multiple bit positions of each memory address.

11. The apparatus of claim 8, further comprising:
    a remap register coupled to the control logic, the remap register configured to hold the shuffle map; and a transaction counter coupled to the control logic, the transaction counter configured to increment a transaction count value responsive to each memory transaction, wherein the control logic is configured to compute each respective bit ratio of the multiple bit ratios based on the transaction count value and the respective bit count value of the respective bit position of the multiple bit positions of each memory address.

12. A method comprising:

tracking multiple bit count values corresponding to multiple bit positions across multiple memory addresses using multiple bit counters, including counting occurrences of a reference bit value at each bit position of the multiple bit positions across the multiple memory addresses using the multiple bit counters;

computing a respective bit ratio corresponding to each respective bit position of the multiple bit positions based on a respective bit count value of the multiple bit count values accumulated across the multiple memory addresses for the respective bit position; and determining a shuffle map based on the respective bit ratio corresponding to each respective bit position of the multiple bit positions.

13. The method of claim 12, further comprising:

incrementing a bit count value of the multiple bit count values stored in a bit counter of the multiple bit counters responsive to the reference bit value occurring at a bit position of the multiple bit positions of a memory address of the multiple memory addresses, a position of the bit counter of the multiple bit counters corresponding to a position of the bit position of the multiple bit positions.

14. The method of claim 12, further comprising:

determining the shuffle map based on which bit positions of the multiple bit positions of a memory address correspond to set bits of a cache memory.

15. The method of claim 12, further comprising:

computing the respective bit ratio corresponding to each respective bit position of the multiple bit positions based on the respective bit count value of the multiple bit count values and a transaction count value; and transmitting, from a host device to a memory device, at least one memory command that includes the shuffle map.

16. The method of claim 12, further comprising:

ranking each respective bit ratio corresponding to each respective bit position of the multiple bit positions based on a proximity of the respective bit ratio to a reference bit ratio; and determining the shuffle map based on the ranking.

17. The method of claim 16, further comprising:

determining the shuffle map by assigning memory address bit positions based on:
the ranking of each respective bit ratio, and
which multiple memory address bit positions correspond to multiple selected memory portions.

18. An apparatus comprising:

a memory;

an interface configured to receive at least one memory command via an interconnect;

a remap register configured to hold a shuffle map;

a shuffle circuit coupled to the memory, the interface, and the remap register;

the shuffle circuit configured to shuffle multiple memory addresses to produce multiple shuffled memory addresses using the shuffle map, the multiple shuffled memory addresses having bit values that are balanced over time at bit positions that correspond to selected memory portions of the memory;

a bit counter array coupled to the interface and including multiple bit counters, the bit counter array configured to track multiple bit count values corresponding to multiple bit positions across the multiple memory addresses, each respective bit counter of the multiple bit counters configured to increment a respective bit count value of the multiple bit count values responsive to a reference bit value occurring across the multiple memory addresses at a respective bit position of the multiple bit positions of each memory address; and control logic coupled to the bit counter array, the control logic configured to determine the shuffle map using the multiple bit counters of the bit counter array.

19. The apparatus of claim 18, wherein:

the apparatus comprises a memory device;

the memory device comprises a memory portion balancer, the memory portion balancer including at least the remap register, the shuffle circuit, the bit counter array, and the control logic;

the interface is configured to receive the multiple memory addresses and another shuffle map from a host device via the interconnect; and the memory device is configured to access the memory using the multiple shuffled memory addresses.

20. The apparatus of claim 18, wherein:

the control logic is configured to determine the shuffle map based on multiple bit ratios, each respective bit ratio of the multiple bit ratios based on the respective bit count value of the respective bit counter of the multiple bit counters of the bit counter array.

* * * * *